(12) United States Patent
Bandyopadhyay et al.

(10) Patent No.: US 12,530,919 B2
(45) Date of Patent: Jan. 20, 2026

(54) RELEVANCE FACTOR VARIATION AUTOENCODER ARCHITECTURE FOR ANALYZING COGNITIVE DRAWING TESTS

(71) Applicant: University of Florida Research Foundation, Incorporated, Gainesville, FL (US)

(72) Inventors: Sabyasachi Bandyopadhyay, Gainesville, FL (US); Catherine Elizabeth Price, Gainesville, FL (US); Parisa Rashidi, Gainesville, FL (US); Patrick J. Tighe, Gainesville, FL (US)

(73) Assignee: University of Florida Research Foundation, Incorporated, Gainesville, FL (US)

( * ) Notice: Subject to any disclaimer, the term of this patent is extended or adjusted under 35 U.S.C. 154(b) by 0 days.

(21) Appl. No.: 19/103,653

(22) PCT Filed: Aug. 4, 2023

(86) PCT No.: PCT/US2023/071694
§ 371 (c)(1),
(2) Date: Feb. 13, 2025

(87) PCT Pub. No.: WO2024/039980
PCT Pub. Date: Feb. 22, 2024

(65) Prior Publication Data
US 2025/0259471 A1    Aug. 14, 2025

Related U.S. Application Data

(60) Provisional application No. 63/371,425, filed on Aug. 15, 2022.

(51) Int. Cl.
*G06V 30/42* (2022.01)
*G06V 10/764* (2022.01)
(Continued)

(52) U.S. Cl.
CPC ............ *G06V 30/42* (2022.01); *G06V 10/764* (2022.01); *G06V 10/7715* (2022.01);
(Continued)

(58) Field of Classification Search
CPC .. G06V 30/42; G06V 10/764; G06V 10/7715; G06V 10/7753; G06V 10/82; G16H 50/20; A61B 5/4088
See application file for complete search history.

(56) References Cited

U.S. PATENT DOCUMENTS

| | | | |
|---|---|---|---|
| 2021/0076936 A1 | 3/2021 | Agichtein et al. | |
| 2022/0122250 A1 | 4/2022 | Besson et al. | |
| 2022/0165425 A1 | 5/2022 | Schler et al. | |

FOREIGN PATENT DOCUMENTS

| | | | |
|---|---|---|---|
| CN | 108197564 A | 6/2018 | |
| KR | 102421755 B1 | 7/2022 | |
| WO | WO-2023232607 A1 * | 12/2023 | ............. G16H 50/20 |

OTHER PUBLICATIONS

Bandyopadhyay et al. "Variational autoencoder provides proof of concept that compressing CDT to extremely low-dimensional space retains its ability of distinguishing dementia." Sci Rep. May 14, 2022;12(1):7992. doi: 10.1038/s41598-022-12024-8. PMID: 35568709; PMCID: PMC9107463. (Year: 2022).*

(Continued)

*Primary Examiner* — Ross Varndell
(74) *Attorney, Agent, or Firm* — Alston & Bird LLP

(57) ABSTRACT

A method for performing predictive operations, the method comprising receiving a classification dataset comprising clock drawing images, generating, using a classifier, one or more classification outputs, the one or more classification outputs comprising one or more identifications of dementia or non-dementia for respective ones of clock drawing images. The classifier comprises one or more weights based on a latent space associated with a relevance factor varia- (Continued)

tional autoencoder (RF-VAE). The RF-VAE comprises an encoder configured to generate the latent space. The RF-VAE comprises a decoder configured to generate reconstructions of the second one or more clock drawings based on the latent space. The latent space comprises one or more latent dimensions representative of one or more unique aspects of variation associated with the second one or more clock drawings. The one or more latent dimensions comprise minimal total correlation between the one or more latent dimensions and two dimensions.

20 Claims, 21 Drawing Sheets

(51) Int. Cl.
- *G06V 10/77* (2022.01)
- *G06V 10/774* (2022.01)
- *G06V 10/82* (2022.01)
- *G16H 50/20* (2018.01)

(52) U.S. Cl.
CPC .......... *G06V 10/7753* (2022.01); *G06V 10/82* (2022.01); *G16H 50/20* (2018.01)

(56) References Cited

OTHER PUBLICATIONS

Kim, Minyoung, et al. "Relevance factor vae: Learning and identifying disentangled factors." arXiv preprint arXiv:1902.01568. (Year: 2019).*

International Search Report and Written Opinion for Patent Cooperation Treaty Application No. PCT/US2023/071694, dated Nov. 8, 2023, 17 pages.

Bandyopadhyay, et al., "Variational Autoencoder Provides Proof of Concept that Compressing CDT to Extremely Low-dimensional Space Retains its Ability of Distinguishing Dementia", *Scientific Reports*, vol. 12:7992, May 14, 2022, (10 pages), Retrieved from the Internet at <URL:https://www.nature.com/articles/s41598-022-12024-8.pdf>.

Kim, et al., "Relevance Factor VAE: Learning and Identifying Disentangled Factors", Feb. 5, 2019, arXiv:1902.01568v1, (9 pages).

\* cited by examiner

RELEVANCE FACTOR VARIATION AUTOENCODER ARCHITECTURE FOR ANALYZING COGNITIVE DRAWING TESTS

CROSS REFERENCE TO RELATED APPLICATIONS

This application is a National Stage Application, filed under 35 U.S.C. § 371, of International Application No. PCT/US2023/071694, filed Aug. 4, 2023, which claims priority to U.S. Application No. 63/371,425, filed Aug. 15, 2022; the contents of both of which are hereby incorporated by reference in their entirety.

STATEMENT OF GOVERNMENT SUPPORT

This invention was made with government support under grant numbers R01 NR014181, K07 AG066813, K07 AG073468, R01 AG055337, and R01 NS082386 awarded by the National Institutes of Health. The government has certain rights in the invention.

FIELD OF THE DISCLOSURE

The present application relates to computer-implemented techniques for analyzing cognitive drawings tests, and in particular, a machine learning model architecture for interpreting and analyzing clock drawings.

BACKGROUND

Clock drawing is a simple, effective, and inexpensive way to screen for cognitive impairment in individuals with suspected mild cognitive impairment (MCI) or dementia, including Alzheimer's disease (AD) and vascular dementia (VaD). Accurate clock drawing is dependent on the coordination of a host of cognitive abilities. Subtle changes in clock drawing behavior can reveal intricate details about underlying cognitive functioning. Command condition drawing requires the ability to process linguistic components of verbal instructions, syntactic comprehension of these instructions, recalling the semantic attributes of a clock, working memory, effective mental planning, visuospatial processing, and motor skills to execute the drawing effectively. Copy condition drawing requires visual scanning ability, visuoconstruction, and executive functioning to complete the task. Command and copy condition drawings have been shown to test complementary cognitive abilities. Also, performance on a clock drawing test (CDT) may be correlated with other alternative assessments of cognitive frailty, e.g., the Mini-Mental State Examination (MMSE).

Previous literature has explored various ways of analyzing the CDT, ranging from nominal (e.g., "good"/"bad") to elaborate 22 or 31-point analog scoring systems. These systems have tried to describe the CDT based on salient features in the clock drawing where subtle changes can indicate the onset of cognitive ailments. Some scoring systems have been based on analysis of errors assessing semantics, graphomotor functioning, and executive control. Despite having similar psychometric properties, these scoring protocols rely on the examiner's ability to interpret a participant's output leading to potentially unreliable results.

BRIEF SUMMARY

In general, various embodiments of the present disclosure provide methods, apparatus, systems, computing devices, computing entities, and/or the like for performing image classification.

According to one embodiment, a computer-implemented method comprises receiving, by one or more computing devices, a classification dataset comprising first one or more clock drawing images; generating, by the one or more computing devices using a classifier, one or more classification outputs, the one or more classification outputs comprising one or more identifications of dementia or non-dementia for respective ones of the one or more clock drawing images, wherein: (i) the classifier comprises one or more weights based on a latent space associated with a relevance factor variational autoencoder (RF-VAE) machine learning model, (ii) the RF-VAE machine learning model is trained based on a training dataset comprising second one or more clock drawings, (iii) the RF-VAE machine learning model comprises an encoder configured to generate the latent space, (iv) the RF-VAE machine learning model comprises a decoder configured to generate reconstructions of the second one or more clock drawings based on the latent space, (v) the latent space comprises one or more latent dimensions representative of one or more unique aspects of variation associated with the second one or more clock drawings, and (vi) the one or more latent dimensions comprise minimal total correlation between the one or more latent dimensions; and initiating, by the one or more computing devices, performance of one or more prediction-based actions based on the one or more classification outputs.

In some embodiments, the RF-VAE machine learning model is trained based on unsupervised learning with the second one or more clock drawings comprising unlabeled clock drawings. In some embodiments, one or more latent variables associated with the one or more latent dimensions are provided to the classifier as standalone features for distinguishing dementia from non-dementia. In some embodiments, demographic information is provided to the classifier as additional distinguishing features. In some embodiments, the classifier comprises a fully connected feed-forward neural network that is fine-tuned jointly with the encoder. In some embodiments, one or more weights of the encoder is fine-tuned under supervised fine-tuning based on a fine-tuning dataset. In some embodiments, the fine-tuning dataset comprises third one or more clock drawings and labels associated with the third one or more clock drawings. In some embodiments, the latent space comprises dementia and control regions. In some embodiments, the computer-implemented method further comprises identifying the dementia and control regions by using a k-nearest neighbor classifier. In some embodiments, the one or more latent dimensions comprises at least one of i) size, ii) degree and orientation of obovate, iii) prolate—oblate, iv) vertical displacement of a point of intersection of clock hands, v) a first degree and direction of eccentricity of an ellipsoid, vi) angle between clock hands, vii) square—rhomboid clockfaces, viii) a second degree and direction of eccentricity of an ellipsoid opposite of the first degree and direction, ix) a degree and direction of side-bulge of clockface, or x) rotation of clock hands assembly. In some embodiments, the one or more latent dimensions comprises two dimensions.

According to one embodiment, a computing apparatus comprises memory and one or more processors communicatively coupled to the memory. The one or more processors are configured to receive a classification dataset comprising first one or more clock drawing images; generate, using a classifier, one or more classification outputs, the one or more classification outputs comprising one or more identifications of dementia or non-dementia for respective ones of the one or more clock drawing images, wherein: (i) the classifier comprises one or more weights based on a latent space associated with a relevance factor variational autoencoder (RF-VAE) machine learning model, (ii) the RF-VAE machine learning model is trained based on a training dataset comprising second one or more clock drawings, (iii) the RF-VAE machine learning model comprises an encoder configured to generate the latent space, (iv) the RF-VAE machine learning model comprises a decoder configured to generate reconstructions of the second one or more clock drawings based on the latent space, (v) the latent space comprises one or more latent dimensions representative of one or more unique aspects of variation associated with the second one or more clock drawings, and (vi) the one or more latent dimensions comprise minimal total correlation between the one or more latent dimensions; and initiate performance of one or more prediction-based actions based on the one or more classification outputs.

In some embodiments, the RF-VAE machine learning model is trained based on unsupervised learning with the second one or more clock drawings comprising unlabeled clock drawings. In some embodiments, one or more latent variables associated with the one or more latent dimensions are provided to the classifier as standalone features for distinguishing dementia from non-dementia. In some embodiments, demographic information is provided to the classifier as additional distinguishing features. In some embodiments, the classifier comprises a fully connected feed-forward neural network that is fine-tuned jointly with the encoder. In some embodiments, one or more weights of the encoder is fine-tuned under supervised fine-tuning based on a fine-tuning dataset, and the fine-tuning dataset comprises third one or more clock drawings and labels associated with the third one or more clock drawings. In some embodiments, the latent space comprises dementia and control regions. In some embodiments, the one or more processors are further configured to identify the dementia and control regions by using a k-nearest neighbor classifier. In some embodiments, the one or more latent dimensions comprises at least one of i) size, ii) degree and orientation of obovate, iii) prolate—oblate, iv) vertical displacement of a point of intersection of clock hands, v) a first degree and direction of eccentricity of an ellipsoid, vi) angle between clock hands, vii) square—rhomboid clockfaces, viii) a second degree and direction of eccentricity of an ellipsoid opposite of the first degree and direction, ix) a degree and direction of side-bulge of clockface, or x) rotation of clock hands assembly. In some embodiments, the one or more latent dimensions comprises two dimensions.

According to one embodiment, one or more non-transitory computer-readable storage media includes instructions that, when executed by one or more processors, cause the one or more processors to: receive a classification dataset comprising first one or more clock drawing images; generate, using a classifier, one or more classification outputs, the one or more classification outputs comprising one or more identifications of dementia or non-dementia for respective ones of the one or more clock drawing images, wherein: (i) the classifier comprises one or more weights based on a latent space associated with a relevance factor variational autoencoder (RF-VAE) machine learning model, (ii) the RF-VAE machine learning model is trained based on a training dataset comprising second one or more clock drawings, (iii) the RF-VAE machine learning model comprises an encoder configured to generate the latent space, (iv) the RF-VAE machine learning model comprises a decoder configured to generate reconstructions of the second one or more clock drawings based on the latent space, (v) the latent space comprises one or more latent dimensions representative of one or more unique aspects of variation associated with the second one or more clock drawings, and (vi) the one or more latent dimensions comprise minimal total correlation between the one or more latent dimensions; and initiate performance of one or more prediction-based actions based on the one or more classification outputs.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Various embodiments of the present disclosure now will be described more fully hereinafter with reference to the accompanying drawings, in which some, but not all embodiments of the disclosure are shown. Indeed, the disclosure may be embodied in many different forms and should not be construed as limited to the embodiments set forth herein. Rather, these embodiments are provided so that this disclosure will satisfy applicable legal requirements. The term "or" is used herein in both the alternative and conjunctive sense, unless otherwise indicated. The terms "illustrative," "example," and "exemplary" are used to be examples with no indication of quality level. Like numbers refer to like elements throughout.

General Overview and Example Technical Improvements

The present disclosure describes aspects of methods and systems for machine interpretation and analysis of images. In some embodiments, the images may comprise drawings associated with a clock drawing test (CDT) for dementia. According to various embodiments of the present disclosure, clock drawing characteristics may be encoded onto a plurality-dimensional spaces such that machine classification of CDT images may be performed based on the encoding to determine whether the CDT images are indicative of, e.g., dementia vs. non-dementia. As such, machine classification performed by the disclosed system may allow for tracking of progression of dementia in a patient over time. In other embodiments, the disclosed system can also be used to monitor post-operative decline in patients who have received anesthesia.

Figure 1A:
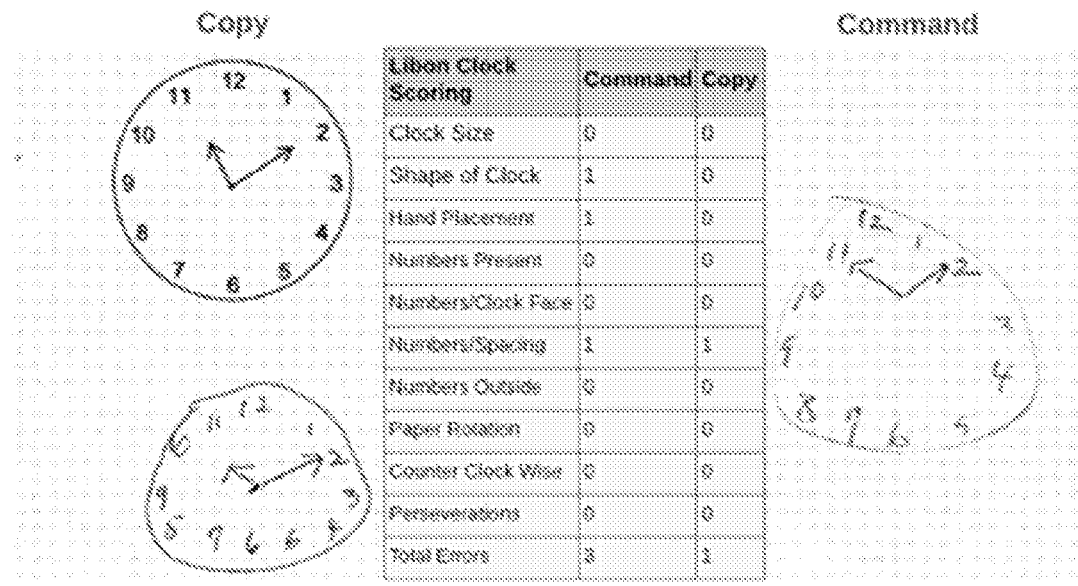
FIG. 1A and FIG. 1B illustrate example test subject clock drawings with corresponding annotations using Libon scoring criteria.
Figure 1B:
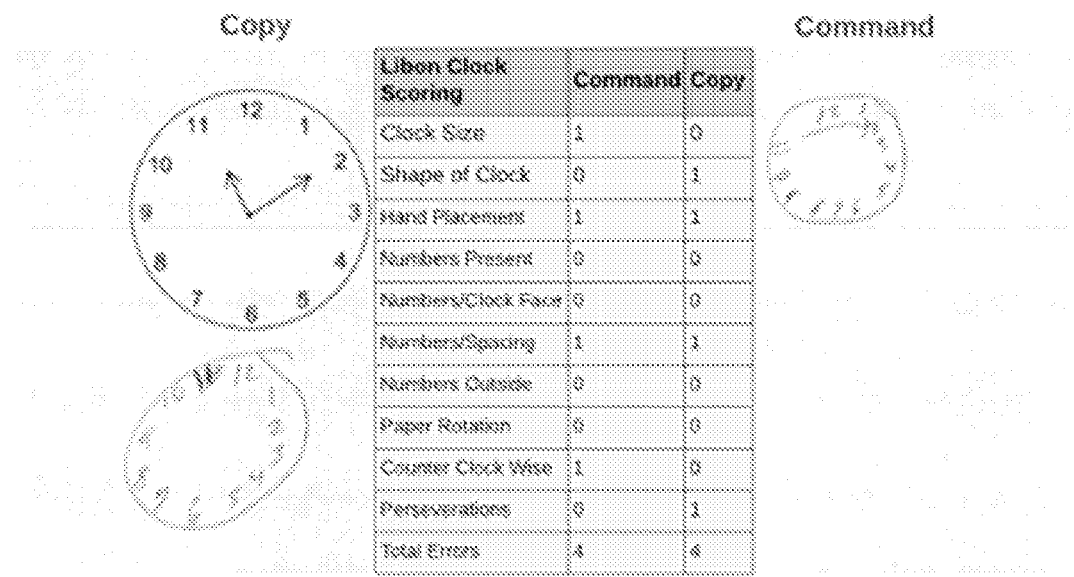

As an example, a CDT may include two parts: a command test condition, where participants are instructed to draw the face of a clock, fill in the hour numbers, and set the hands to ten after eleven; and a copy test condition where participants are instructed to copy a model clock. Example test subject clock drawings for a CDT are depicted in FIG. 1A and FIG. 1B with corresponding annotations using Libon scoring criteria.

As described above, variability in human rater scoring introduces ambiguities that can potentially negatively impact the robustness of any diagnostic test based on the CDT. According to various embodiments of the present disclosure, deep learning (DL) machine learning models may be used to obviate this problem due to their ability to automatically extract a nested hierarchy of features of increasing complexity using back propagation of errors from data. Such hierarchy of features may be extracted in a data-driven manner by continuously assessing correlations between simpler features. The generality and predictive power of the nested hierarchy of features may only be limited by the size of training data. DL models (given they have sufficient data to train), therefore, present an opportunity for developing objective scoring criteria for more robust clinical decision-making.

In some embodiments, an interpretable DL model may be configured to automatically learn key clock drawing features associated with a CDT for classifying individuals as either having dementia (e.g., Alzheimer's Disease (AD) or Vascular dementia (VaD)), or no dementia based on their CDT drawing samples. Deep generative models may improve classification accuracy in semi-supervised learning settings, especially when one has few labeled examples and many more unlabeled examples. According to one embodiment, a semi-supervised DL model can be trained to learn intrinsic variations in clock images from unlabeled data (e.g., of sample clock images) and use a small set of labeled data (e.g., of clock images) to solve the classification task with minimal fine-tuning. For example, a variational autoencoder (VAE) machine learning model may be used to perform a self-supervised learning task. A VAE machine learning model may comprise a generative model configured to learn a joint probability distribution over all variables present in a dataset and use accurate reconstruction of training images as an objective to learn a low-dimensional latent representation in the form of a pre-defined prior distribution.

According to various embodiments of the present disclosure, self-supervised training using unlabeled clock drawing datasets may be performed to learn information-rich features that may be used to generate a classifier configured to classify dementia or non-dementia based on a smaller amount of labeled data than that of the unlabeled clock drawing datasets. In some embodiments, an unlabeled dataset of clock drawings may be used to train a VAE machine learning model, and a considerably smaller labeled dataset may be used to subsequently fine-tune an encoder of the trained VAE machine learning model. An encoder may represent a portion of the VAE machine learning model that encodes a clock drawing into a low-dimensional latent space. As such, even a modest number of features learned from a raw CDT image can encode enough clock drawing anomalies to build an efficient dementia classifier.

In some embodiments, a relevance factor variational autoencoder (RF-VAE) machine learning model may be used to capture meaningful observable sources of variation in a clock drawing in an unsupervised way. RF-VAE machine learning model may comprise a variation of the VAE machine learning model that can leverage a latent space's total correlation (TC) to achieve a disentanglement goal. An RF-VAE machine learning model may focus a TC loss onto relevant factors by tolerating a large prior Kullback-Leibler (KL) divergence while simultaneously eliminating nuisance factors of variation with small prior KL divergences. As such, a semi-supervised learning task may comprise using an unlabeled dataset of clock drawings to train the RF-VAE machine learning model in a label-agnostic way. As such, clock drawing construction may be calibrated using a focused set of informative, disentangled constructional features that are useful for discriminating dementia from non-dementia peers.

According to various embodiments of the present disclosure, encoder weights of a trained RF-VAE machine learning model are fine-tuned in conjunction with a feed-forward, fully connected neural network to classify dementia from control participants. Hyperparameters, including the number of relevant latent dimensions in the RF-VAE machine learning model, may be optimized based on the classification performance. The RF-VAE machine learning model may decompose a clock drawing into a certain number of independent latent features linked to specific constructional aspects.

Example Technical Implementation of Various Embodiments

Embodiments of the present disclosure may be implemented in various ways, including as computer program products that comprise articles of manufacture. Such computer program products may include one or more software components including, for example, software objects, methods, data structures, and/or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query, or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid-state drive (SSD), solid state card (SSC), solid state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of a data structure, apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises a combination of computer program products and hardware performing certain steps or operations.

Embodiments of the present disclosure are described with reference to example operations, steps, processes, blocks, and/or the like. Thus, it should be understood that each operation, step, process, block, and/or the like may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some example embodiments, retrieval, loading, and/or execution may be performed in parallel such that multiple instructions are retrieved, loaded, and/or executed together. Thus, such embodiments can produce specifically configured machines performing the steps or operations specified in the block diagrams and flowchart illustrations. Accordingly, the block diagrams and flowchart illustrations support various combinations of embodiments for performing the specified instructions, operations, or steps.

Example System Architecture

Figure 2:
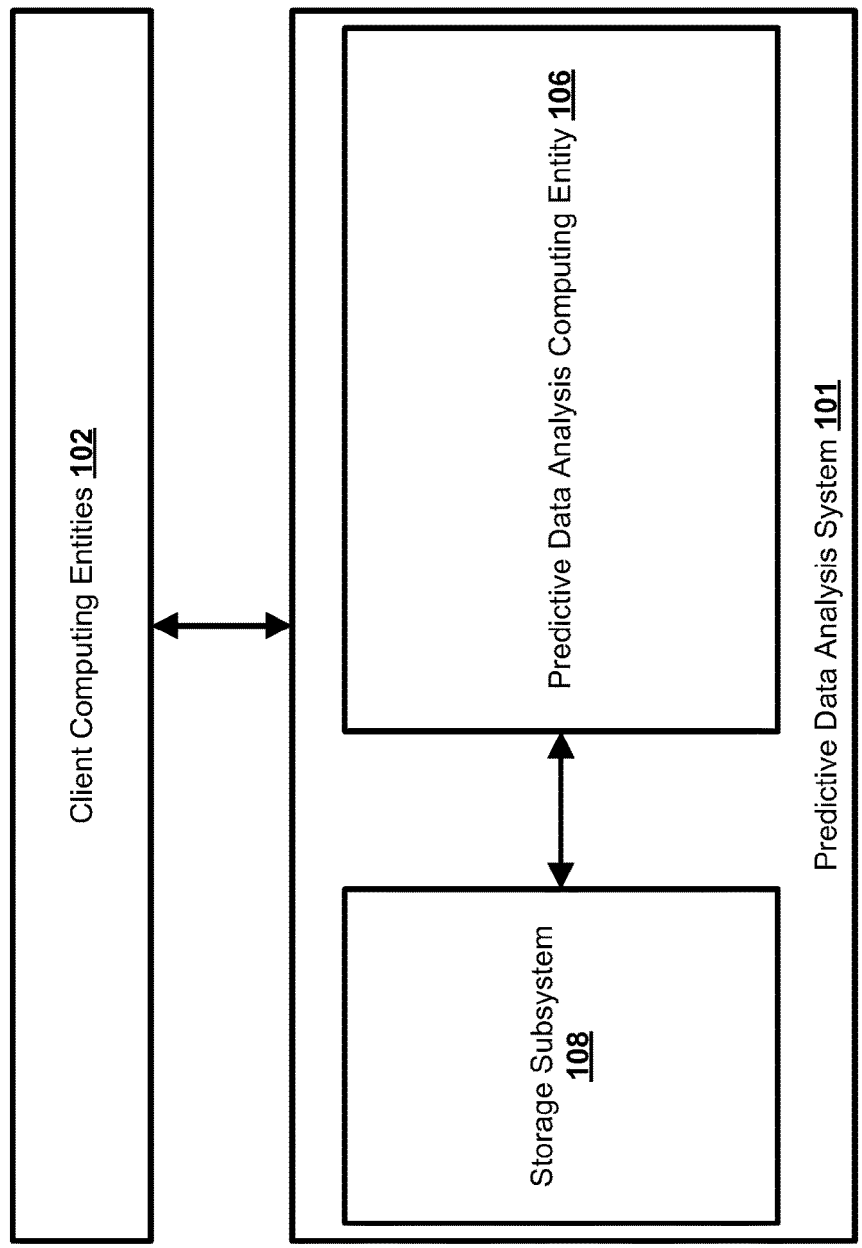
FIG. 2 illustrates an example overview of an architecture that can be used to practice embodiments of the present invention.

FIG. 2 is a schematic diagram of an example architecture 100 for performing predictive data analysis. The architecture 100 includes a predictive data analysis system 101 configured to receive predictive data analysis requests from client computing entities 102, process the predictive data analysis requests to generate predictions, provide the generated predictions to the client computing entities 102, and automatically perform prediction-based actions based on the generated predictions.

An example of a prediction-based action that can be performed using the predictive data analysis system 101 is a request for generating a diagnosis for a CDT sample. For example, in accordance with various embodiments of the present disclosure, a predictive machine learning model may be trained to predict whether a given image comprising a drawing sample from an individual includes features indicative of dementia of the individual.

In some embodiments, predictive data analysis system 101 may communicate with at least one of the client computing entities 102 using one or more communication networks. Examples of communication networks include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, and/or the like).

The predictive data analysis system 101 may include a predictive data analysis computing entity 106 and a storage subsystem 108. The predictive data analysis computing entity 106 may be configured to receive predictive data analysis requests of CDT samples from one or more client computing entities 102, process the predictive data analysis requests to generate predictions corresponding to the predictive data analysis requests, provide the generated predictions to the client computing entities 102, and automatically perform prediction-based actions based on the generated predictions.

The storage subsystem 108 may be configured to store input data used by the predictive data analysis computing entity 106 to perform predictive data analysis as well as model definition data used by the predictive data analysis computing entity 106 to perform various predictive data analysis tasks. The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

A. Example Predictive Data Analysis Computing Entity

Figure 3:
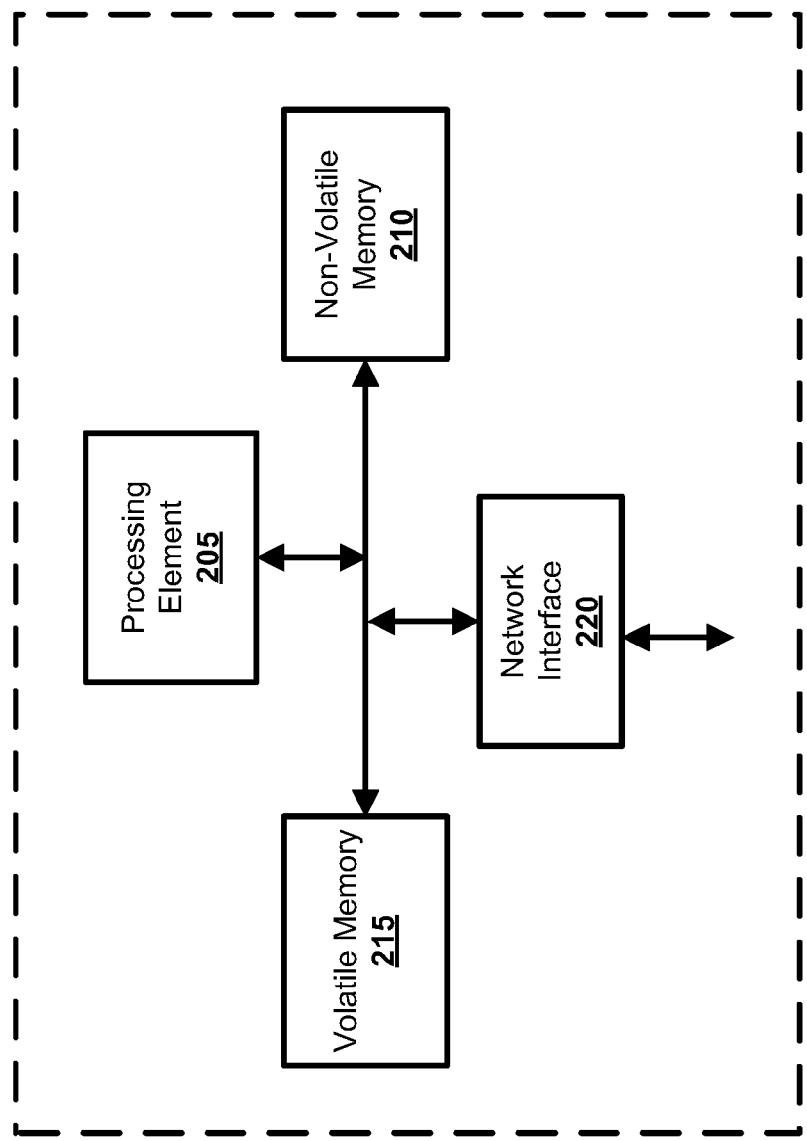
FIG. 3 illustrates an example predictive data analysis computing entity in accordance with some embodiments discussed herein.

FIG. 3 provides a schematic of a predictive data analysis computing entity 106 according to one embodiment of the present disclosure. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the predictive data analysis computing entity 106 may also include one or more communications interfaces 220 for communicating with various computing entities, such as by communicating data, content, information, and/or similar terms used herein interchangeably that can be transmitted, received, operated on, processed, displayed, stored, and/or the like.

As shown in FIG. 3, in one embodiment, the predictive data analysis computing entity 106 may include, or be in communication with, one or more processing elements 205 (also referred to as processors, processing circuitry, and/or similar terms used herein interchangeably) that communicate with other elements within the predictive data analysis computing entity 106 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present disclosure when configured accordingly.

In one embodiment, the predictive data analysis computing entity 106 may further include, or be in communication with, non-volatile media (also referred to as non-volatile storage, memory, memory storage, memory circuitry, and/or similar terms used herein interchangeably). In one embodiment, the non-volatile storage or memory may include one or more non-volatile storage or memory media 210, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the predictive data analysis computing entity 106 may further include, or be in communication with, volatile media (also referred to as volatile storage, memory, memory storage, memory circuitry, and/or similar terms used herein interchangeably). In one embodiment, the volatile storage or memory may also include one or more volatile storage or memory media 215, including, but not limited to, RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the predictive data analysis computing entity 106 with the assistance of the processing element 205 and operating system.

As indicated, in one embodiment, the predictive data analysis computing entity 106 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the predictive data analysis computing entity 106 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the predictive data analysis computing entity 106 may include, or be in communication with, one or more input elements, such as a keyboard input, a mouse input, a touch screen/display input, motion input, movement input, audio input, pointing device input, joystick input, keypad input, and/or the like. The predictive data analysis computing entity 106 may also include, or be in communication with, one or more output elements (not shown), such as audio output, video output, screen/display output, motion output, movement output, and/or the like.

B. Example Client Computing Entity

Figure 4:
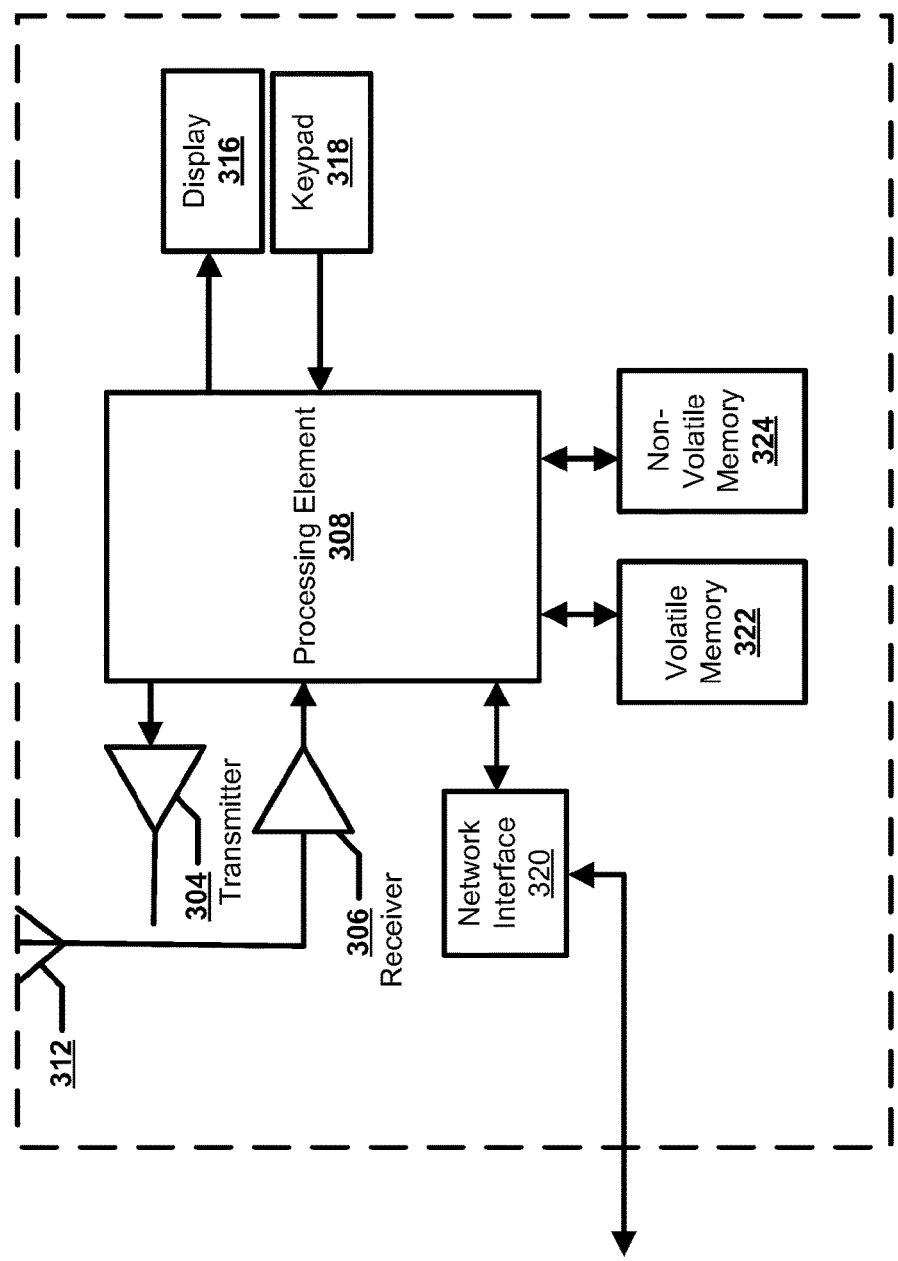
FIG. 4 illustrates an example client computing entity in accordance with some embodiments discussed herein.

FIG. 4 provides an illustrative schematic representative of a client computing entity 102 that can be used in conjunction with embodiments of the present disclosure. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Client computing entities 102 can be operated by various parties. As shown in FIG. 4, the client computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the client computing entity 102 may be capable of operating with one or more air interface standards, communication protocols, modulation types, and access types. More particularly, the client computing entity 102 may operate in accordance with any of a number of wireless communication standards and protocols, such as those described above with regard to the predictive data analysis computing entity 106. In a particular embodiment, the client computing entity 102 may operate in accordance with multiple wireless communication standards and protocols, such as UMTS, CDMA2000, 1xRTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the client computing entity 102 may operate in accordance with multiple wired communication standards and protocols, such as those described above with regard to the predictive data analysis computing entity 106 via a network interface 320.

Via these communication standards and protocols, the client computing entity 102 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The client computing entity 102 can also download changes, add-ons, and updates, for instance, to its firmware, software (e.g., including executable instructions, applications, program modules), and operating system.

According to one embodiment, the client computing entity 102 may include location determining aspects, devices, modules, functionalities, and/or similar words used herein interchangeably. For example, the client computing entity 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal-Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the client computing entity's 102 position in connection with a variety of other systems, including cellular towers, Wi-Fi access points, and/or the like. Similarly, the client computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops), and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The client computing entity 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the client computing entity 102 to interact with and/or cause display of information/data from the predictive data analysis computing entity 106, as described herein. The user input interface can comprise any of a number of devices or interfaces allowing the client computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the client computing entity 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The client computing entity 102 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the client computing entity 102. As indicated, this may include a user application that is resident on the entity or accessible through a browser or other user interface for communicating with the predictive data analysis computing entity 106 and/or various other computing entities.

In another embodiment, the client computing entity 102 may include one or more components or functionality that are the same or similar to those of the predictive data analysis computing entity 106, as described in greater detail above. As will be recognized, these architectures and descriptions are provided for example purposes only and are not limiting to the various embodiments.

In various embodiments, the client computing entity 102 may be embodied as an artificial intelligence (AI) computing entity, such as an Amazon Echo, Amazon Echo Dot, Amazon Show, Google Home, and/or the like. Accordingly, the client computing entity 102 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

C. Example Machine Learning Frameworks

The present disclosure provides methods and systems for encoding clock drawing anomalies from a dataset of unannotated CDTs by self-supervised pre-training of a VAE machine learning model with latent variables and using the latent variables to classify dementia CDTs from non-dementia CDTs. A VAE machine learning model may comprise an unsupervised generative model with an encoder that projects input training data onto a lower-dimensional latent space and a decoder that reconstructs data from random samples drawn from this latent space. A latent space distribution may be created according to a Gaussian distribution N ($\mu x, \sigma x$). Being a generative model, the VAE machine learning model can be trained to randomly sample the latent space distribution to reconstruct images resembling data in the input training dataset but not explicitly present in the input training dataset. According to various embodiments of the present disclosure, the VAE machine learning model may use the difference between original and reconstructed images as an objective to learn a low-dimensional latent representation in the form of a pre-defined prior distribution. Using a deep generative model may improve classification accuracy in semi-supervised learning settings, especially when fewer labeled examples are available than unlabeled examples.

According to various embodiments of the present disclosure, training a VAE machine learning model is based on reconstructing images of CDTs, e.g., digital clock drawings. The VAE machine learning model may compress relevant information present in the reconstructed clock images into a highly informative two-dimensional vector, which may be useful for classifying dementia versus non-dementia. The latent space of the VAE machine learning model can be used to generate artificial clock drawings which may show statistical resemblance to human-drawn CDTs of the input dataset, but do not replicate salient features/details of clocks such as digits, hands, and ticks, which are central to scoring clocks using traditional scoring techniques. Instead of local features, the trained VAE latent space may capture global features such as clockface eccentricity, clockface area, length of hands and distance from the point of connection of hands to the clock center. Some of these global features may be pertinent in distinguishing amongst various subtypes of dementia, as well as in separate cognitive tasks. For example, smaller clock face area may be associated with micrographia and subcortical disease profiles where there is presence of primary executive dysfunction (e.g., Parkinson's disease). Individuals with executive dysfunction and Parkinson's disease may also exhibit planning deficits in laying out numbers. Clock face hand placement may also indicate disinhibition and visual attention difficulties.

Figure 5:
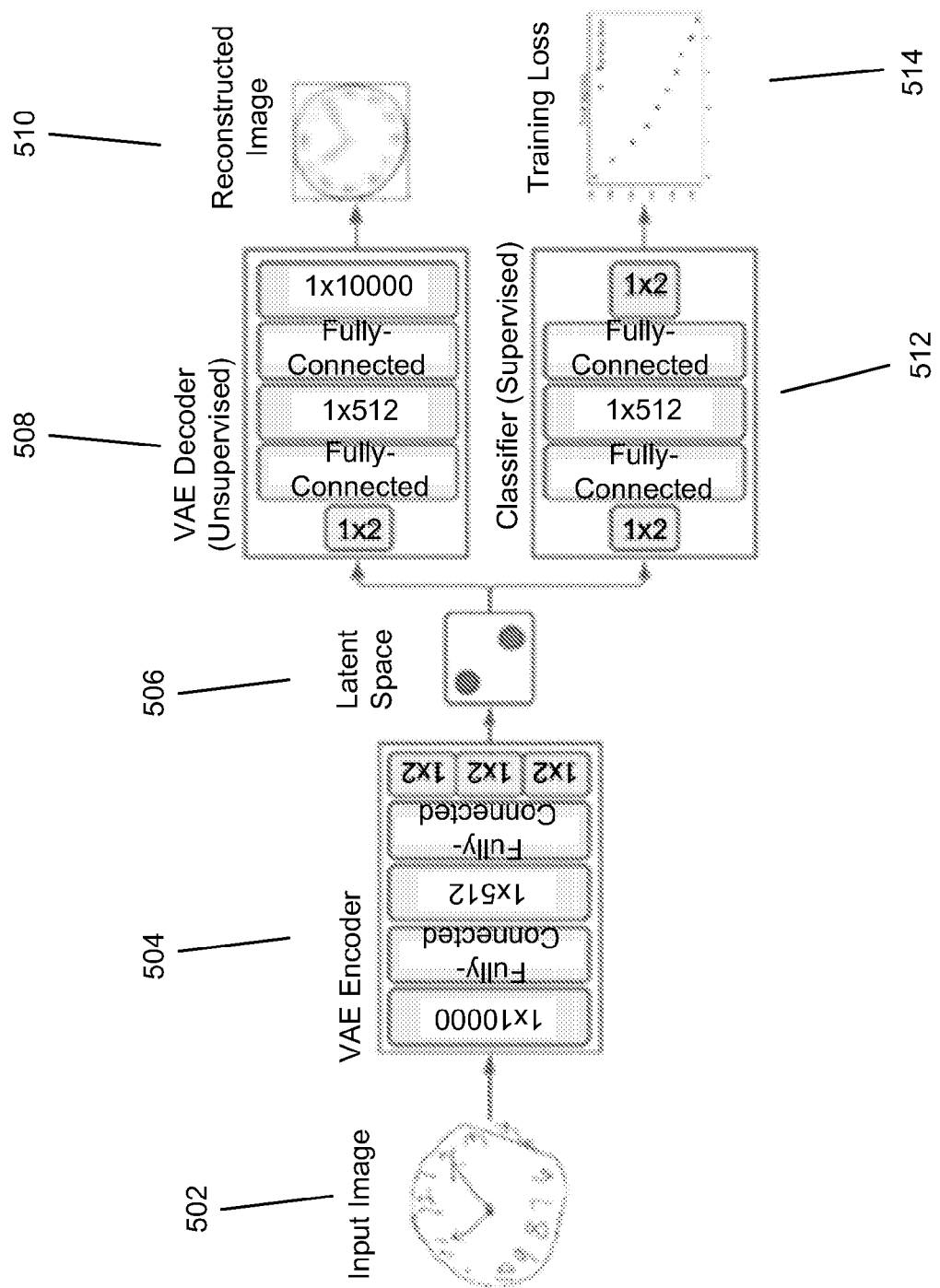
FIG. 5 and FIG. 6 illustrate example schematics of an architecture based on a variational autoencoder machine learning model in accordance with some embodiments discussed herein.

FIG. 5 presents an example schematic of an architecture based on a VAE machine learning model. The VAE machine learning model may be trained with an unlabeled dataset comprising input image 502 to generate a latent space 506 that may be used to construct classifiers (such as classifier 512) in accordance with some embodiments of the present disclosure. As depicted, input clock images 502 are passed into the VAE encoder 504, for example, in the form of a 1×10,000 vector. Images 502 may comprise CDTs comprising unlabeled clock drawings. The latent space 506 generated by VAE encoder 504 establishes a VAE encoder-decoder couplet with VAE decoder 508 which may be trained (unsupervised) to minimize reconstruction loss of clock drawings 510 by using an information bottleneck of, for example, a two-dimensional latent space. The dimensions of the latent space 506 generated by the VAE encoder 504 may capture a compressed representation of a clock drawing which may be passed into a classifier 512 (supervised) that mimics the architecture of the VAE decoder. The classifier may be fine-tuned to reduce training loss 514 in predicting dementia.

Figure 6:
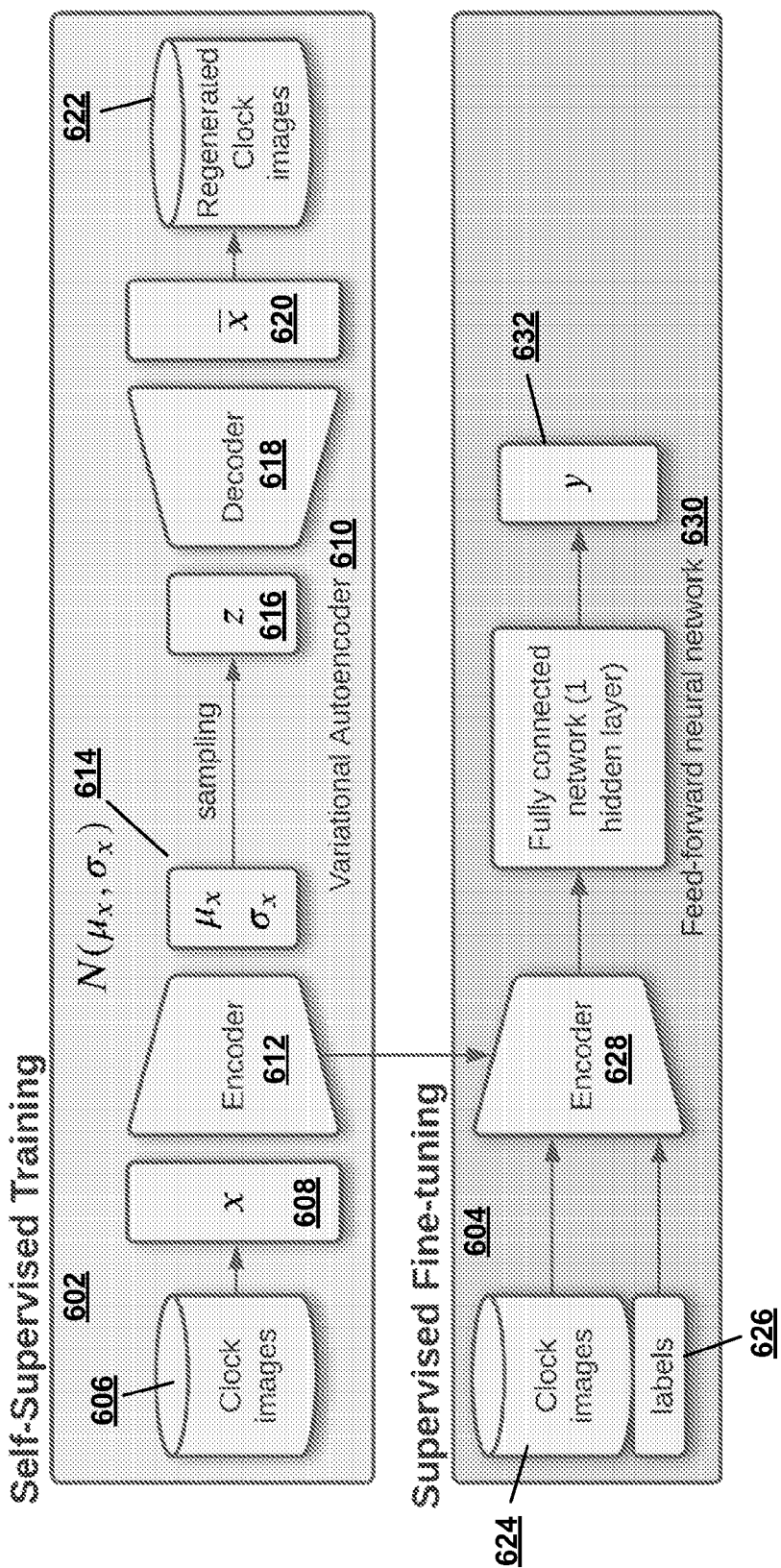

FIG. 6 presents an example schematic of self-supervised training of a VAE machine learning model and supervised fine-tuning of encoder weights from the trained VAE machine learning model for downstream classification. Self-supervised training 602 comprises a training of the VAE machine learning model 610 with a training dataset 606 comprising, for example, unlabeled clock images 606. The VAE machine learning model 610 comprises an encoder 612 and a decoder 618. The encoder 612 may select and extract representative features of each clock image 608 and then compress the representative features into a latent space 614 comprising a Gaussian distribution N ($\mu x, \sigma x$). The decoder 618 samples the latent space 614 by sampling certain representative features 616 to generate reconstructed clock images 620, which may be stored as regenerated clock images 622. In some embodiments, the regenerated clock images 622 may be provided as feedback for comparison with clock images 606 to minimize reconstruction loss.

A compressed latent space of the VAE machine learning model 610 may be fine-tuned via supervised fine-tuning 604 by training encoder 628 with an annotated fine-tuning dataset comprising clock images 624 and labels 626 to improve performance. In some embodiments, the annotated fine-tuning dataset may comprise clock images labeled with dementia and control clock groups. Encoder 628 comprises trained encoder weights from encoder 612 representative of a latent space which may be used to create a task-specific classifier configured to generate a classification 632 (e.g., classify dementia vs. non-dementia). The classifier may comprise a fully connected feed-forward neural network architecture 630 and the number of neurons in each layer of the classifier may be finalized by using randomized grid search inside a K-fold cross validation setting. In some embodiments, the performance of the classifier may be validated on, for example, two validation datasets and several performance metrics, such as area under the receiver operating characteristic (AUROC), accuracy, sensitivity, specificity, precision, and negative predictive value (NPV).

In some embodiments, clock images may be preprocessed to reduce whitespace. Clock drawing images with excessive whitespace may cause a VAE machine learning model to create latent spaces which encode the whitespace inside clock drawings in the form of white noise instead of clock drawing features such as digits, hands and, clockface. For example, a VAE machine learning model may learn that the closest it can get to statistically reconstructing a clock drawing is to encode its whitespace instead of drawn features such as digits, hands and, clockface which are of clinical importance. To minimize encoding of whitespace, the size of clock drawings may be limited in size.

Figure 7:
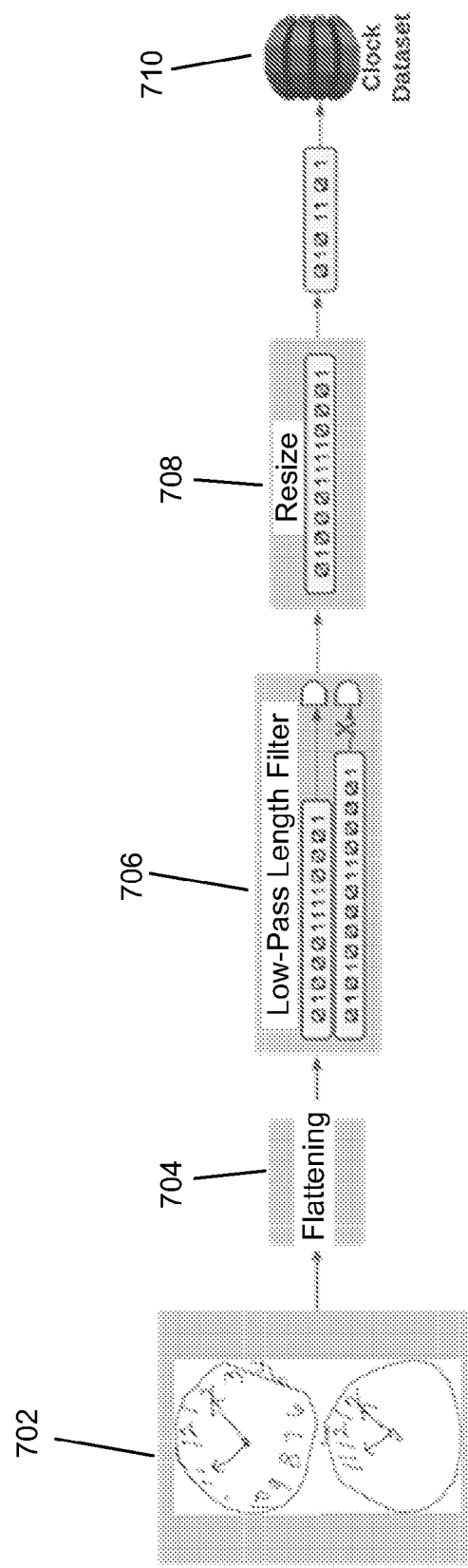
FIG. 7 illustrates an example preprocessing workflow for flattening clock images in accordance with some embodiments discussed herein.

FIG. 7 presents an example preprocessing workflow of clock images. A set of clock drawings 702 is passed to a flattening module 704 to flatten the set of clock drawings 702 into one-dimensional vectors. The flattened clock drawings may then be filtered via a low-pass length filter 706 to retain given ones of the clock drawings that are less than or equal to a given pixel size, e.g., 40,000 pixels. The resulting drawing vectors may then be resized (708), e.g., to 10,000 pixels, and added used for a training or fine-tuning dataset 710. Clock image preprocessing for whitespace may be optional, and in some embodiments, the clock drawings may be fed into a VAE machine learning model without such preprocessing.

Figure 8:
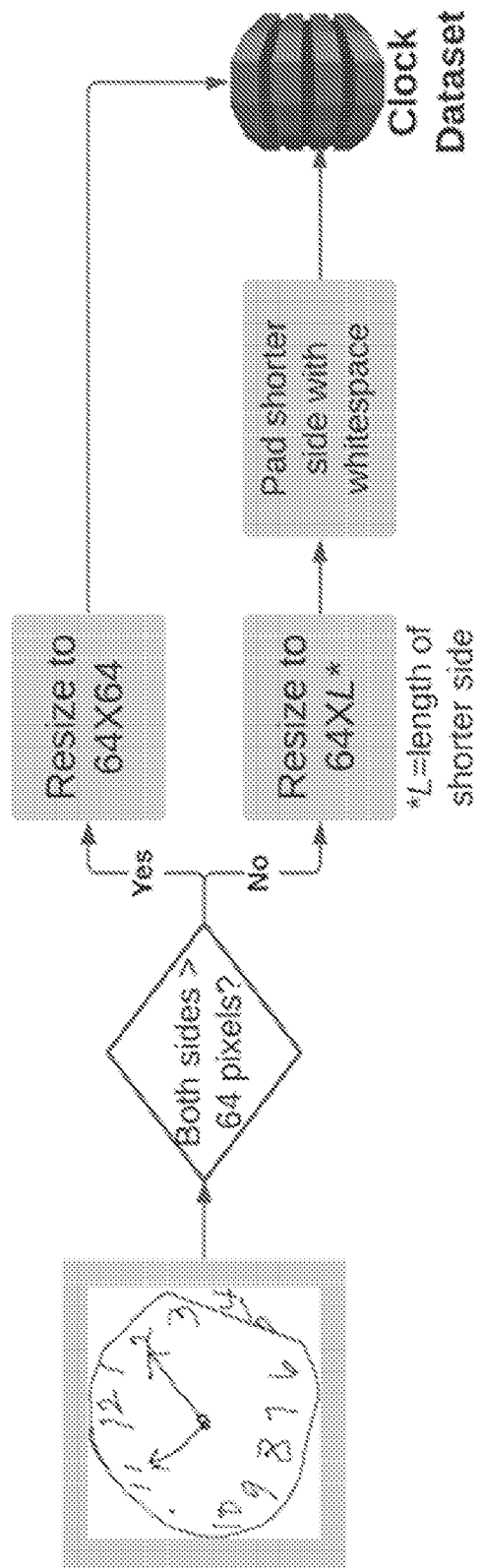
FIG. 8 illustrates an example preprocessing pipeline for contour detection in accordance with some embodiments discussed herein.

In some embodiments, individual clock drawings may be extracted using contour detection. FIG. 8 presents an example preprocessing pipeline after contour detection for use with a VAE machine learning model. Clock drawings may be preprocessed to crop boundaries of the clock drawing, pad with white space to a square, and resize to 64×64. Resizing clock drawings to 64×64 may include white-space padding if, for example, one side is initially smaller than 64 pixels.

Figures 9A, 9B:
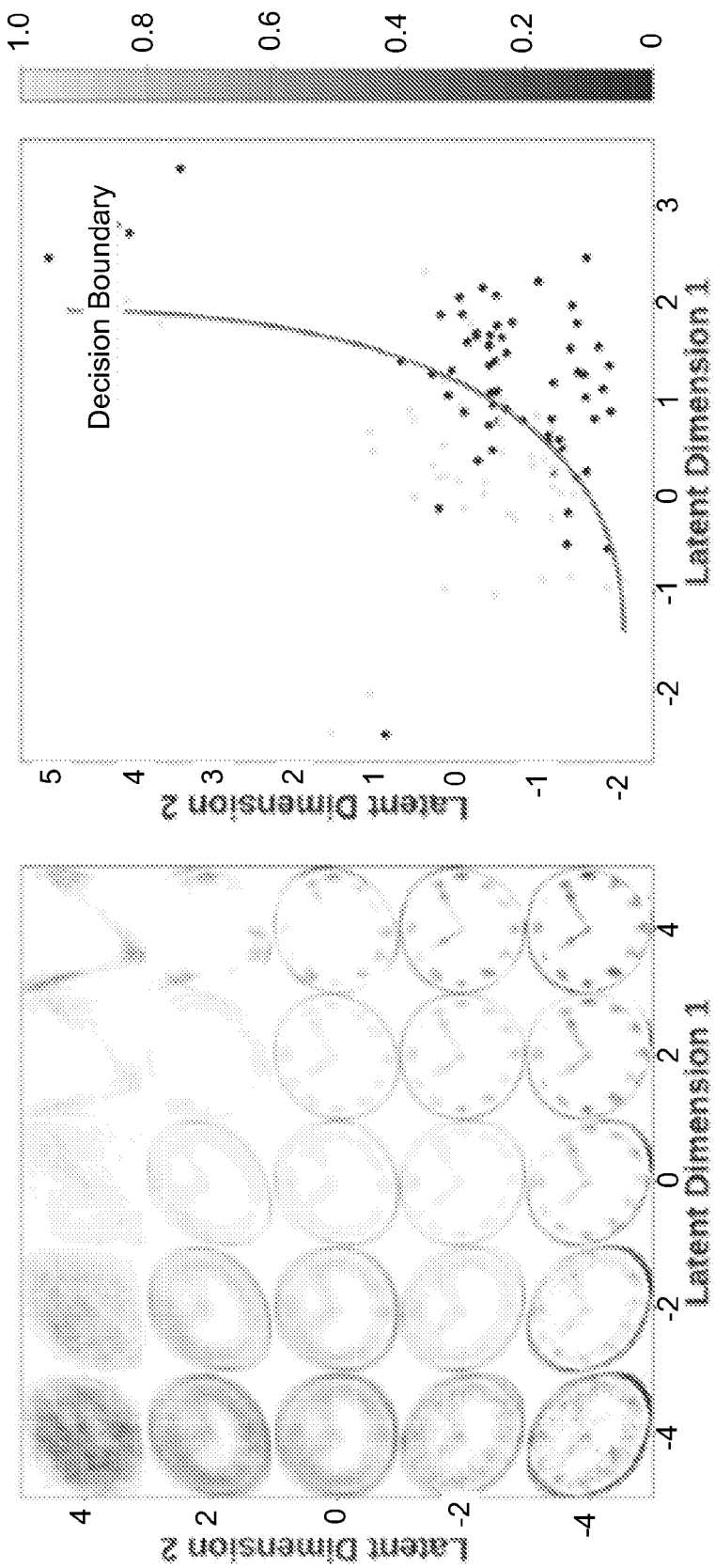
FIG. 9A illustrates an operational example of reconstructions of clock drawings performed by a variational autoencoder machine learning model in accordance with some embodiments discussed herein.
FIG. 9B illustrates example latent space projections in accordance with some embodiments discussed herein.

FIG. 9A illustrates operational examples of reconstructed clock drawings performed by the VAE machine learning model as a function of its latent variables. As depicted in FIG. 9A, reconstructed clock images are distributed in a VAE latent space. Clock drawing reconstructions may be represented as a function of two VAE latent dimensions. The depicted clock reconstructions show a variety of reconstructions generated by the VAE machine learning model to capture the distribution of the training dataset. A smooth transition between the reconstructed clocks may result from a normal distribution to which the VAE latent variables are restricted.

A trained VAE machine learning model encoder may be used to generate a classifier after fine-tuning with a fine-tuning dataset. FIG. 9B depicts a distribution of reconstructions of dementia/control clocks from a fine-tuning dataset as a function of their latent space vectors. In particular, a scatterplot is depicted in FIG. 9B showing a distribution of the latent vectors belonging to clocks in the fine-tuning dataset divided into dementia (e.g., spectrogram intensity=1) and control (e.g., spectrogram intensity=0) groups. The depicted scatterplot shows visible separation between dementia and control clocks. The curve in the scatterplot represents a possible decision boundary between the two groups. A trained classifier according to various embodiments of the present disclosure may learn such a decision boundary to classify the two groups.

Figure 10:
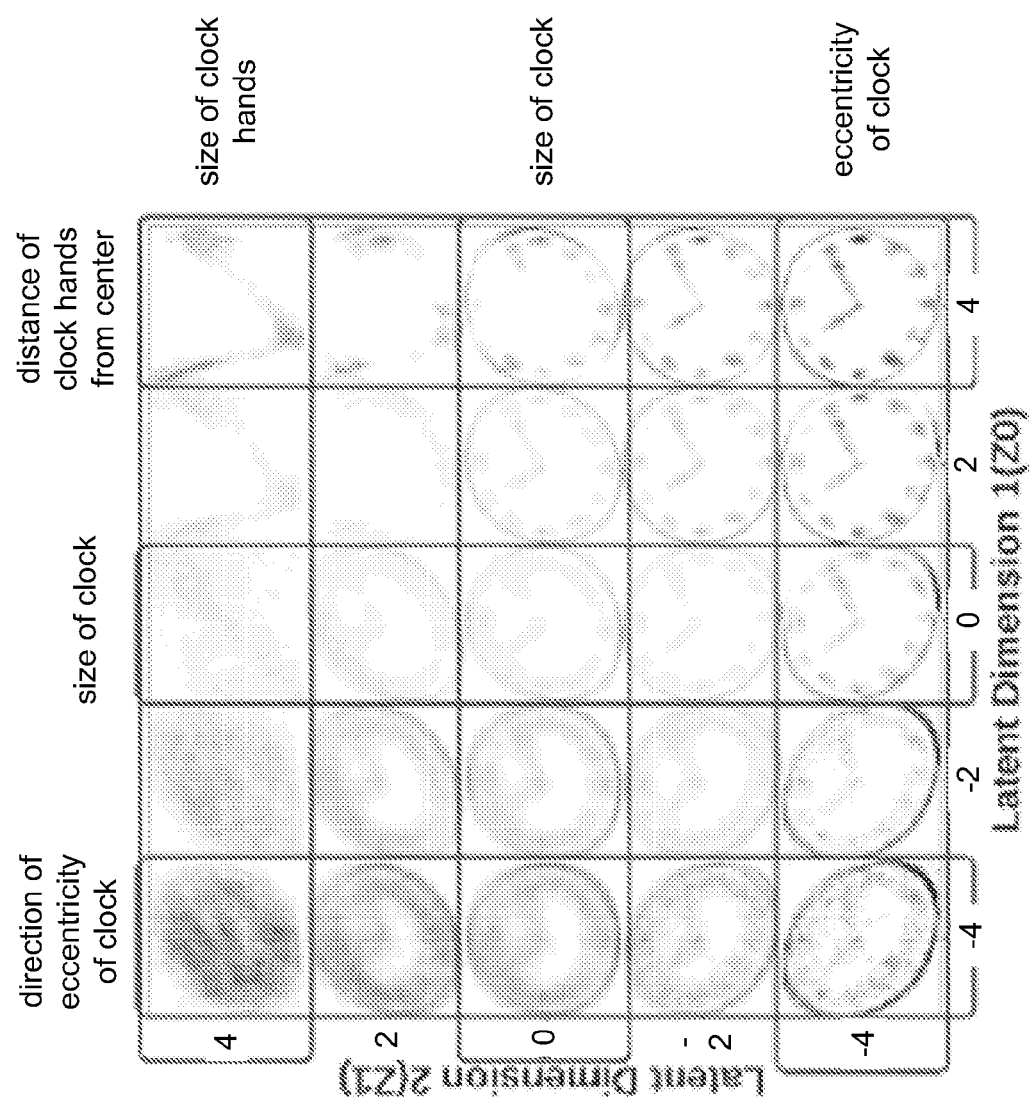
FIG. 10 and FIG. 11 illustrate example latent manifolds projected by a variational autoencoder machine learning model in accordance with some embodiments discussed herein.

Clock image reconstructions may denote features that are salient for human perception such as digits and ticks but are not captured by the VAE latent space. Instead, according to various embodiments of the present disclosure, the VAE latent space captures statistical features of clock drawings such as eccentricity, size, size of clock hands and distance of clock hands from the geometric center, as shown in FIG. 10. The features depicted in the chart may be correlated to the latent dimensions of the VAE latent space and mutually entangled in this space.

As further depicted in FIG. 10, the latent manifold, upon which a trained VAE machine learning model projects clock drawings, may comprise a two-dimensional vector space that can be functionally divided into five regions which delineate the variation of different clock drawing features and anomalies. The VAE machine learning model may not be provided with prior information about the generative features of clock drawing. Therefore, the clock features appear in an entangled/mutually correlated manner in the two-dimensional latent space of the VAE machine learning model. Generative factors of clock drawing may be discovered via traversals over the VAE latent space. Different regions of the two-dimensional manifold constructed by the VAE machine learning model may be mapped to specific artistic features/anomalies of clock drawings.

FIG. 10 further depicts a first latent dimension 1 (plotted along the X-axis), abbreviated as Z0, and a second latent dimension 2 (plotted along the Y-axis), abbreviated as Z1. The left half of the latent manifold space (Z0<0) is representative of direction of eccentricity of a clock drawing. Clock eccentricity reverses from left to right as Z1, given Z0 (Z1|Z0), changes from −4 to +4, passing through a point of zero eccentricity (circular clock at Z1|Z0=0). The size of a clock drawing is a correlated variable which decreases as Z1|Z0 increases from −4 to +4 in the left half of the two-dimensional manifold. Whereas the right half of the latent manifold (Z0>0) is related to the distance of the point of intersection of clock hands from the clock's geometric center.

The point of intersection of clock hands moves downwards from the geometric center as Z1|Z0 traverses from −4 to +4. This change is also associated with a loss of the circular periphery of the clock which is an important anomaly present in clocks drawn by patients with advanced stages of dementia. The top of the latent space (Z1>0) encodes an increasing length of clock hands and distance of point of intersection of clock hands to geometric center mixed with each other. Length of clock hands and area of the clock face increase as Z0|Z1 changes from −4 to +4. The bottom half of the latent space (Z1<0) encodes the eccentricity of the clockface. Eccentricity decreases as Z0|Z1 changes from −4 to +4 in this region of the latent space. Furthermore, eccentricity is interlinked with an increase in clockface area as Z0|Z1 changes from −4 to +4 in this region. The X-axis which traces the change in Z0|(Z1=0) encodes the size of the clockface, evident from the increasing clarity of the clock drawing along this line. As such, many physically understandable clock features and anomalies are encoded in different regions of the latent space of the trained VAE machine learning model.

Figure 11:
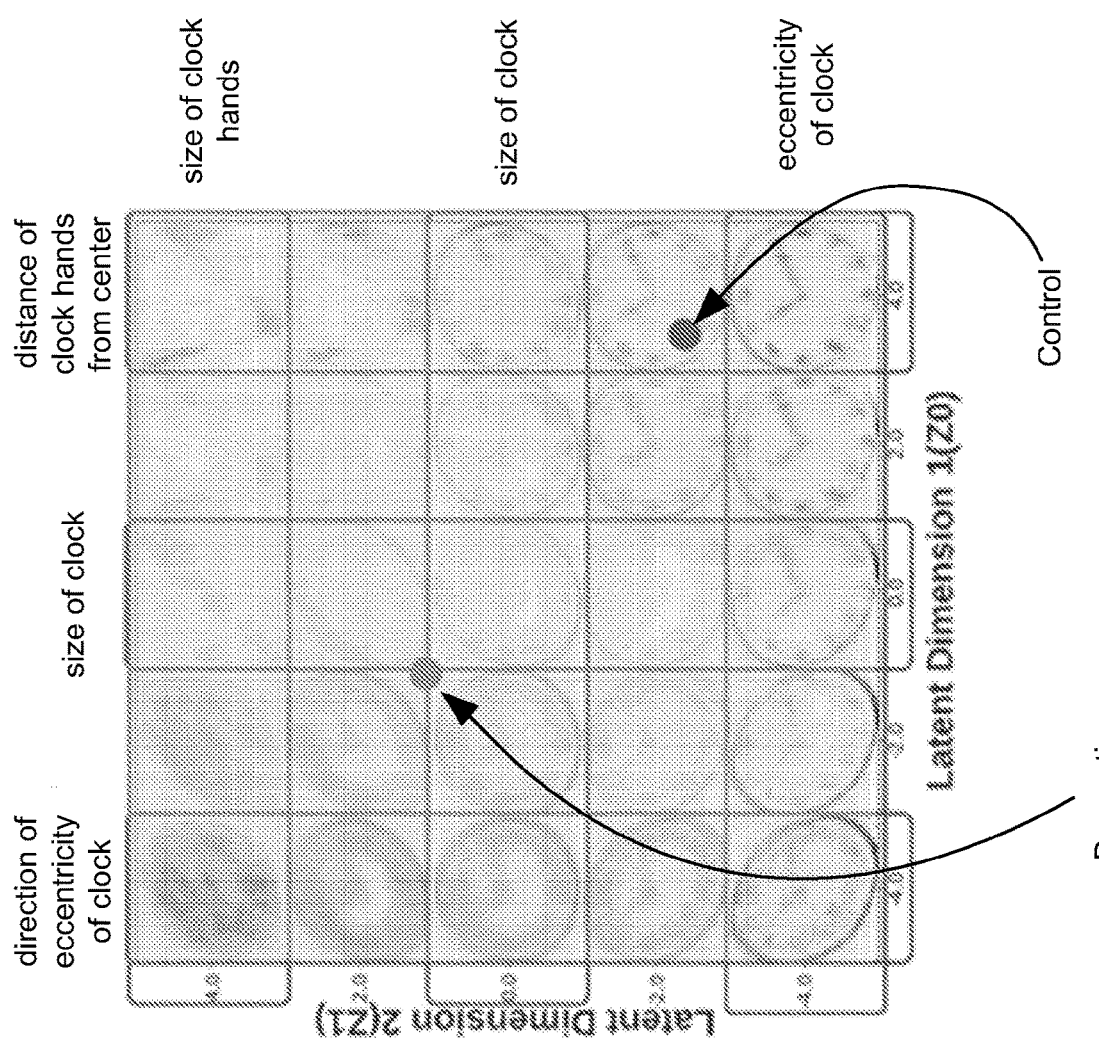

To improve clinical utility and interpretability of the disclosed VAE machine learning model, a k-nearest neighbor classifier may be used to operationalize the VAE latent space itself into "dementia" and "control" regions, as depicted in FIG. 11. An ideal k may be determined using K-fold cross validation on the fine-tuning dataset. In some embodiments, k-nearest neighbors of each training datapoint are labeled uniformly while simultaneously varying k to find a best decision boundary between dementia and control samples. This decision boundary can be used to physically divide the VAE latent space into two regions: dementia and control. The control region may be smaller and comprise normal sized clocks with circular clockfaces whose hands intersect at the geometric center of the clockface. The dementia region may be larger in size and encodes various anomalies detected by the VAE machine learning model.

As described above, a VAE machine learning model may comprise a generative model that can learn a lower-dimensional representation of input data in the form of a Gaussian distribution which it samples to reconstruct the input data. The non-linear output decoder network compensates the loss of generality caused by the prior normal distribution. However, one disadvantage of the VAE latent distribution is a lack of disentanglement of factors. Ideally, each latent variable should be exclusively responsible for a variation of a unique aspect in the input data.

According to various embodiments of the present disclosure, an RF-VAE machine learning model may be used to learn one or more meaningful sources of variations in clock drawings in their disentangled latent representations. In some embodiments, the RF-VAE machine learning model may use a total correlation (TC) in the latent space to improve disentanglement of relevant sources of variation while tolerating significant KL divergences from prior normal distributions while simultaneously identifying factors having low divergence from these normal distribution priors as "nuisance sources of variation."

Figure 12:
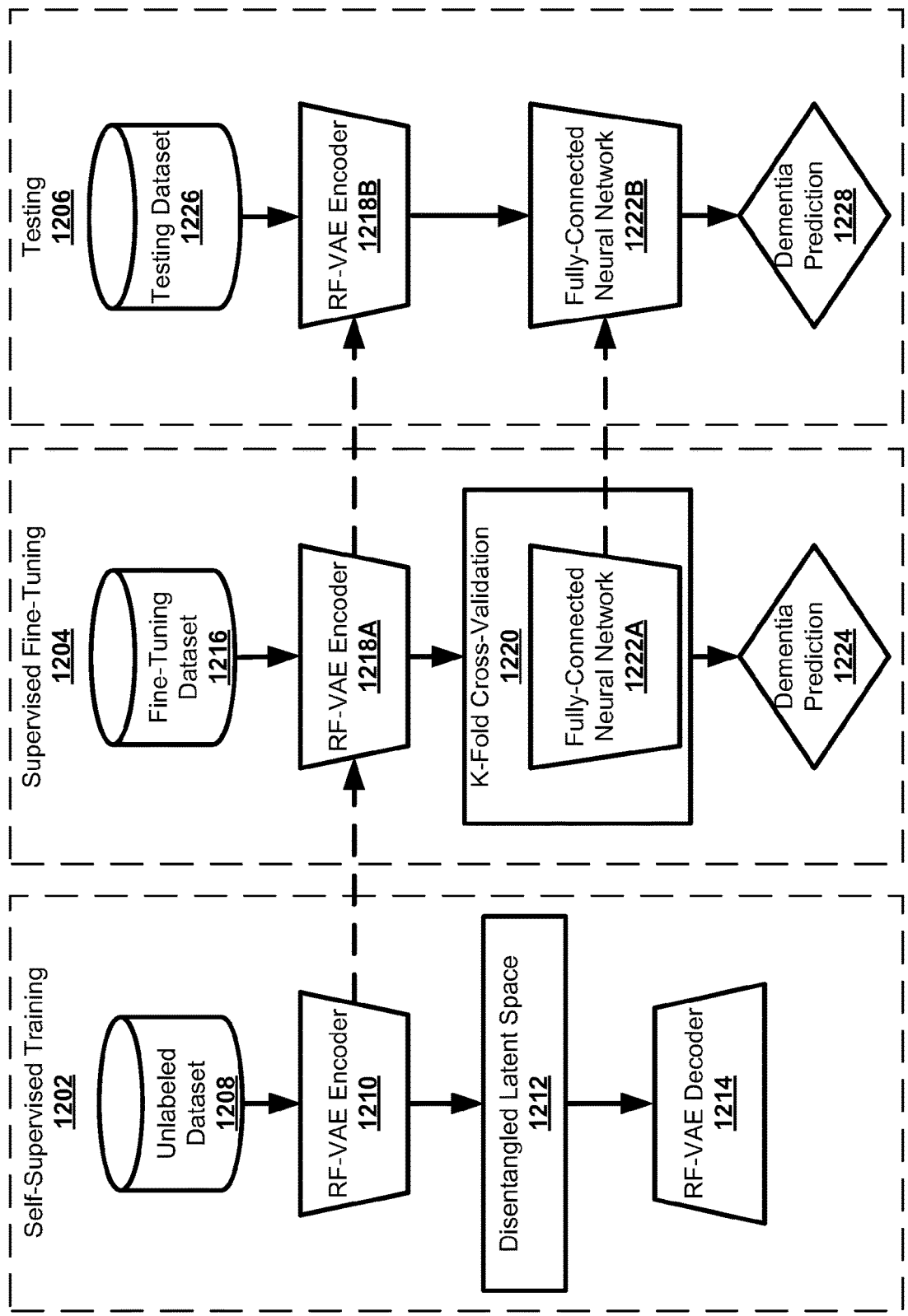
FIG. 12 illustrates an example data flow diagram of an RF-VAE machine learning model architecture for training, fine-tuning, and testing neural network classifiers in accordance with some embodiments discussed herein

FIG. 12 depicts an example data flow diagram of an example RF-VAE machine learning model architecture for training, fine-tuning, and testing neural network classifiers. An RF-VAE machine learning model undergoes unsupervised training 1202 with an unlabeled dataset 1208. The unlabeled dataset, for example, may comprise 23,521 unlabeled clock drawings. The RF-VAE encoder 1210 may be trained to map characteristics of the unlabeled dataset 1208 into a disentangled latent space 1212 of latent variables by minimizing total correlation between latent dimensions to disentangle them. Latent variables from the disentangled latent space 1212 may be used by RF-VAE decoder 1214 to reconstruct data samples from the unlabeled dataset 1208, e.g., clock drawings, which may be trained to minimize reconstruction loss.

Weights from the trained RF-VAE encoder 1210 may be transferred to supervised fine-tuning 1204 for refinement into RF-VAE Encoder 1218A based on a fine-tuning dataset 1216 (e.g., using 84 dementia and 263 normal clocks). The latent space generated by RF-VAE Encoder 1218A may be fed to a fully connected neural network 1222A and optimized with the use of K-fold cross-validation 1220 (e.g., a 10-fold cross validation) to generate a fine-tuned classifier (e.g., a dementia vs. non-dementia neural network classifier) for dementia prediction 1224. The RF-VAE Encoder 1218A and the fully connected neural network 1222A are tested in testing 1206 (e.g., on 28 dementia and 87 normal clocks). The performance of dementia prediction 1228 based on RF-VAE Encoder 1218B and the fully connected neural network 1222B may be assessed with the testing dataset 1226.

Figure 13:
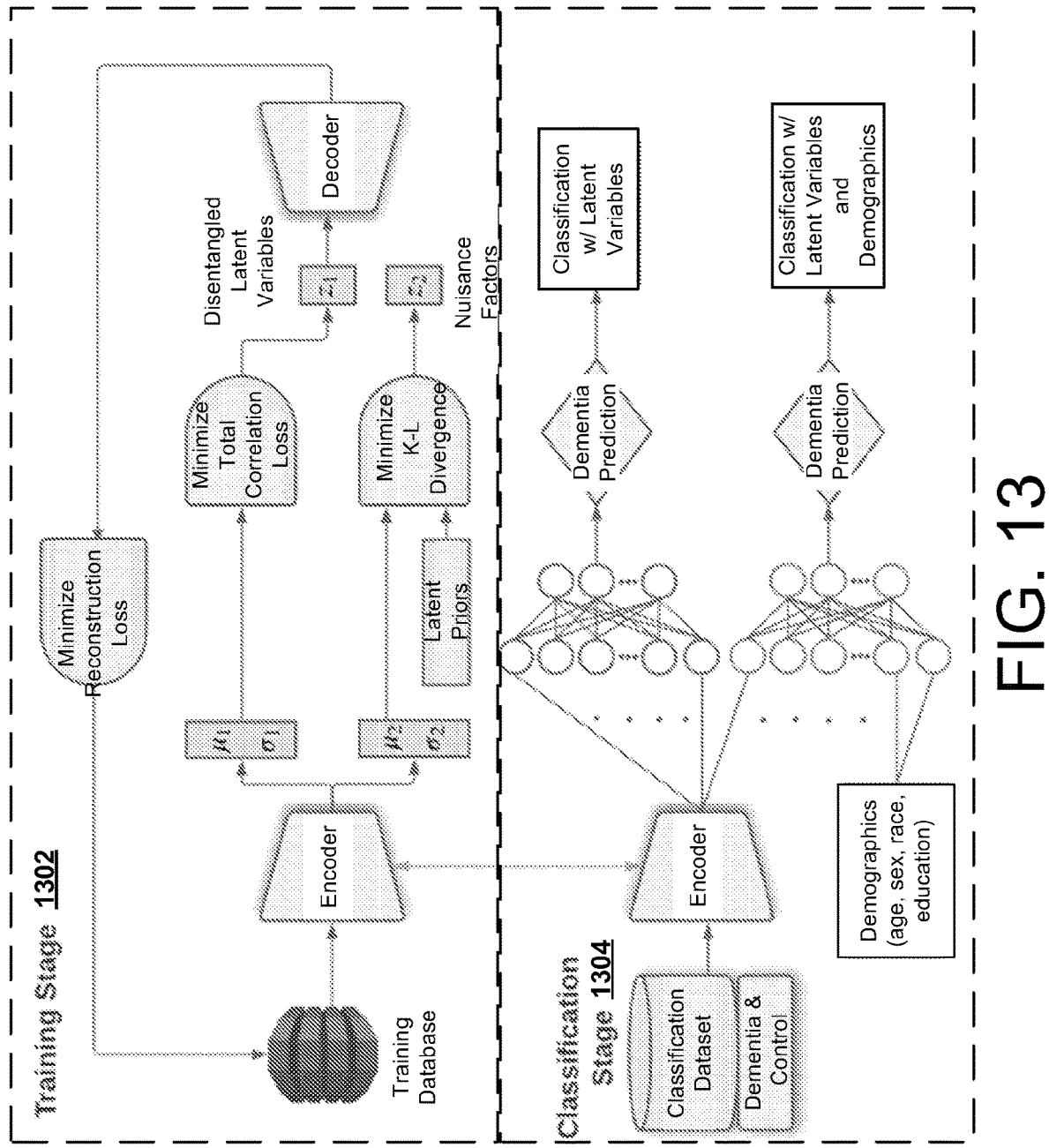
FIG. 13 illustrates an example architecture for minimizing different loss functions during training of an RF-VAE machine learning model and classification in accordance with some embodiments discussed herein.

FIG. 13 presents an example architecture for minimizing different loss functions during training of an RF-VAE machine learning model and classification. The training stage 1302 comprises a training process of the RF-VAE machine learning model. Training the RF-VAE machine learning model may comprise identifying and disentangling latent variables present in the training dataset in an unsupervised manner. A training dataset for the training stage 1302 may comprise an unlabeled dataset of clock drawings, such as from CDTs. An example training dataset may include 23,521 clock drawings from participants aged≥65 years, primarily English speaking, who completed clock drawing to command and copy conditions as part of routine medical care assessment in a preoperative setting. Exclusion criteria may be as follows: non-fluent in the English language; education<4 years; visual, hearing, or motor extremity limitation that potentially inhibits the production of a valid clock drawing.

Clock drawings may comprise two completed clock drawings—a) command condition where participants may be instructed to "draw the face of a clock, put in all the numbers, and set the hands to ten after eleven," and b) a copy condition wherein participants may be presented with a model of a clock and asked to copy the same underneath it. In some embodiments, a digital pen and associated smart paper may be used to complete the drawings. The digital pen may capture and measure pen positions on the smart paper (e.g., 75 times/second) in addition to rendering a drawing. The smart paper (e.g., 8.5×11 inch) may be partitioned in half, giving participants a drawing area of 8.5×5.5 inch for each clock drawing. Clock drawings may be stored as a training dataset and used to train the RF-VAE machine learning model. In some embodiments, clock drawings whether drawn according to a command condition or a copy condition are not distinguished in the training dataset to enable the machine learning model to learn clock encodings that are agnostic to any cognitive outcome and hence generalizable to multiple different classification tasks.

An encoder of the RF-VAE machine learning model may learn to represent clock drawings during the training stage 1302. A disentangled latent space of the RF-VAE machine learning model may be constructed by minimizing the loss between original and reconstructed clock drawings generated by a decoder of the RF-VAE machine learning model and minimizing the total correlation loss between latent dimensions to disentangle them. Furthermore, feature relevance may be ensured in the latent space by eliminating latent variables that do not diverge significantly from previously defined prior distributions and eliminating nuisance factors of variation with small prior KL divergences.

The classification stage 1304 comprises using the trained encoder weights of the RF-VAE machine learning model to support a task-specific classifier. Latent variables identified by the RF-VAE machine learning model may be used to generate a classifier configured to distinguish and/or classify dementia from non-dementia peers (dementia prediction). In some embodiments, trained encoder weights from training stage 1302 may be fine-tuned (e.g., with dementia and control labeled data to distinguish dementia from control clocks) jointly with a fully connected neural network for classifying dementia from non-dementia clock drawings from a classification dataset. The addition of demographics (or other contextual information) may improve dementia prediction, generating classification with latent variables and demographics. For example, demographics, such as age, sex, race, and years of education may be added to the latent dimensions to train another classifier with higher performance.

Example System Operations

Various embodiments of the present disclosure describe steps, operations, processes, methods, functions, and/or the like for analyzing images drawn by individuals to screen for cognitive frailties, including dementia. In some embodiments, an RF-VAE machine learning model may be trained to encode data samples from a training dataset to a latent space comprising an optimal number of latent dimensions for reconstructing data samples representative of the training data. In some embodiments, the RF-VAE machine learning model may identify unique constructional features of clock drawings in an unsupervised manner. The latent space of the RF-VAE machine learning model may be used to generate a classifier for classifying, for example, hand-drawn clock images that exhibit either dementia or non-dementia.

Figure 14:
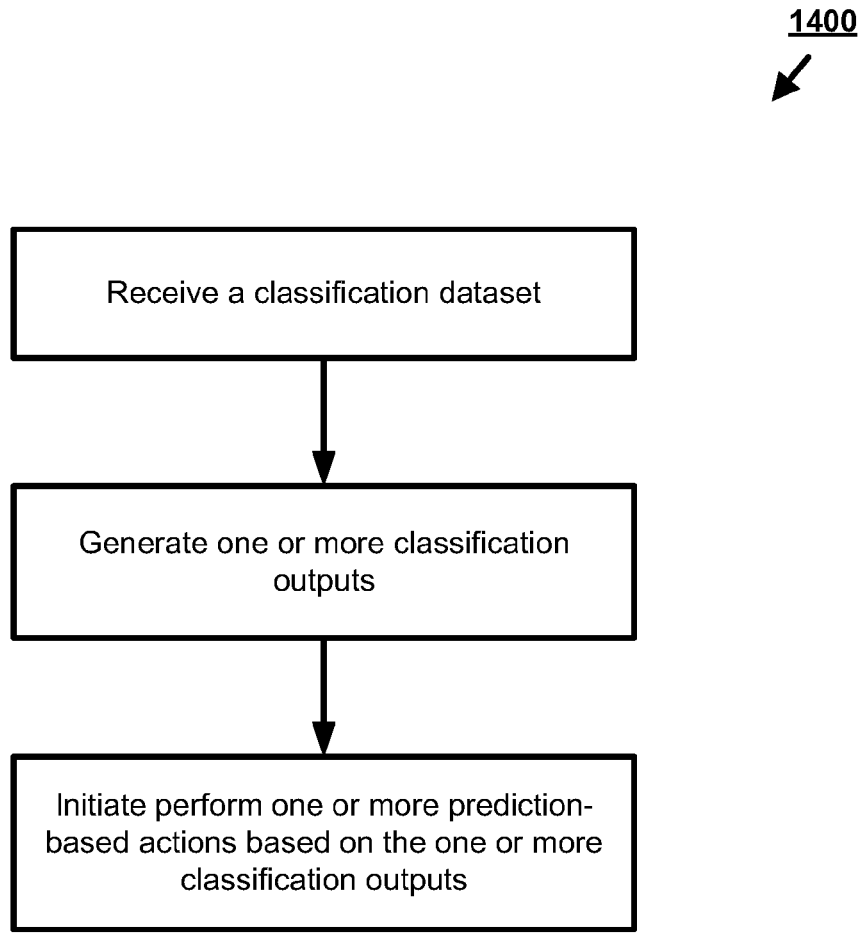
FIG. 14 illustrates a flowchart diagram of an example process 1400 for performing image classification in accordance with some embodiments discussed herein.

FIG. 14 is a flowchart diagram of an example process 1400 for performing image classification according to some embodiments of the present disclosure. The process 1400 includes example operations that may be performed by the predictive data analysis computing entity 106, and the predictive data analysis computing entity 106 comprises means, such as processing element 205, non-volatile memory 210, volatile memory 215, network interface 220, and/or the like, for performing the example operations.

In some embodiments, at step 1402, the predictive data analysis computing entity receives a classification dataset. The classification dataset may comprise first one or more clock drawing images that are provided to the predictive data analysis computing entity as input for classification analysis. In some embodiments, the first one or more clock drawing images comprises hand-drawn images provided by individuals taking a CDT to screen for dementia or testing of cognitive/neurological functions.

In some embodiments, at step 1404, the predictive data analysis computing entity generates, using a classifier, one or more classification outputs. The one or more classification outputs may comprise one or more identifications of dementia or non-dementia for respective ones of the one or more clock drawing images from the classification dataset. In some embodiments, the classifier comprises one or more weights based on a latent space associated with an RF-VAE machine learning model. The latent space may comprise an encoding of features associated with a training dataset. In some embodiments, the RF-VAE machine learning model is trained based on a training dataset comprising second one or more clock drawings. As such, in an example embodiment, clock drawing features are defined in the latent space.

In some embodiments, the RF-VAE machine learning model comprises an encoder configured to generate the latent space by compressing representative features of data samples within a training dataset and embedding the representative features into the latent space. In some embodiments, RF-VAE machine learning model undergoes unsupervised training with an unlabeled dataset. The unlabeled dataset may comprise unlabeled clock drawings. The encoder may be trained to map characteristics of the unlabeled dataset into a latent space. In some embodiments, the latent space comprises one or more latent dimensions representative of one or more unique aspects of variation associated with the second one or more clock drawings. The latent space may be disentangled by minimizing the total correlation loss between latent dimensions to disentangle them. Furthermore, feature relevance may be ensured in the latent space by eliminating latent variables that do not diverge significantly from previously defined prior distributions and eliminating nuisance factors of variation with small prior KL divergences.

In some embodiments, certain latent variables associated with the one or more latent dimensions may be provided as input to the classifier as standalone features for distinguishing dementia from non-dementia. In some embodiments, demographics or other contextual information may be further provided to the classifier as additional distinguishing features for better distinguishing performance. In some embodiments, weights of the encoder trained under unsupervised training may be further fine-tuned under supervised fine-tuning with fine-tuning dataset. The fine-tuning dataset may comprise third one or more clock drawings and labels associated therewith (e.g., with dementia and control labels to distinguish dementia from control clocks). In some embodiments, the classifier may comprise a fully connected neural network that is fine-tuned jointly with the encoder for classifying dementia from non-dementia clock drawings from the classification dataset.

In some embodiments, the RF-VAE machine learning model further comprises a decoder configured to generate reconstructions of the training data samples, e.g., of the second one or more clock drawings, based on the latent space. In some embodiments, the RF-VAE machine learning model may be trained such that the loss between original samples from the training data and reconstructions generated by the decoder are minimized. For example, reconstructed clock drawings generated by the decoder may be compared with the second one or more clock drawings. The comparison may be used to modify or adjust weights of the encoder.

In some embodiments, at step 1404, the predictive data analysis computing entity initiates the performance of one or more prediction-based actions based on the one or more classification outputs. Initiating the performance of the one or more prediction-based actions based on the one or more classification outputs comprises, for example, performing a resource-based action (e.g., allocation of resource), generating a diagnostic report, generating and/or executing action scripts, generating alerts or messages, or generating one or more electronic communications. The one or more prediction-based actions may further include displaying visual renderings of the aforementioned examples of prediction-based actions in addition to values, charts, and representations associated with the one or more classification outputs using a prediction output user interface.

According to an example embodiment, the RF-VAE machine learning model may be used to delineate constructional latent features in clocks drawn by participants as part of a routine medical assessment in a preoperative setting. Examples of constructional latent features may include i) size, ii) degree and orientation of obovate, iii) prolate—oblate, iv) vertical displacement of the point of intersection of clock hands, v) degree and direction of the eccentricity of the ellipsoid, vi) angle between clock hands, vii) square—rhomboid clockfaces, viii) degree and direction of the eccentricity of the ellipsoid in an opposite sense than v, ix) degree and direction of side-bulge of clockface, or x) rotation of clock hands assembly. These features may be deemed independent generative factors that are significant sources of variation of clock drawings and encoded as latent variables in a latent space during unsupervised training of the RF-VAE machine learning model. Each clock drawing may comprise a superposition of these features to different degrees. However, not all variables corresponding to atypical occurrences in clock drawings may be equally differentially expressed in dementia.

Figure 15A:
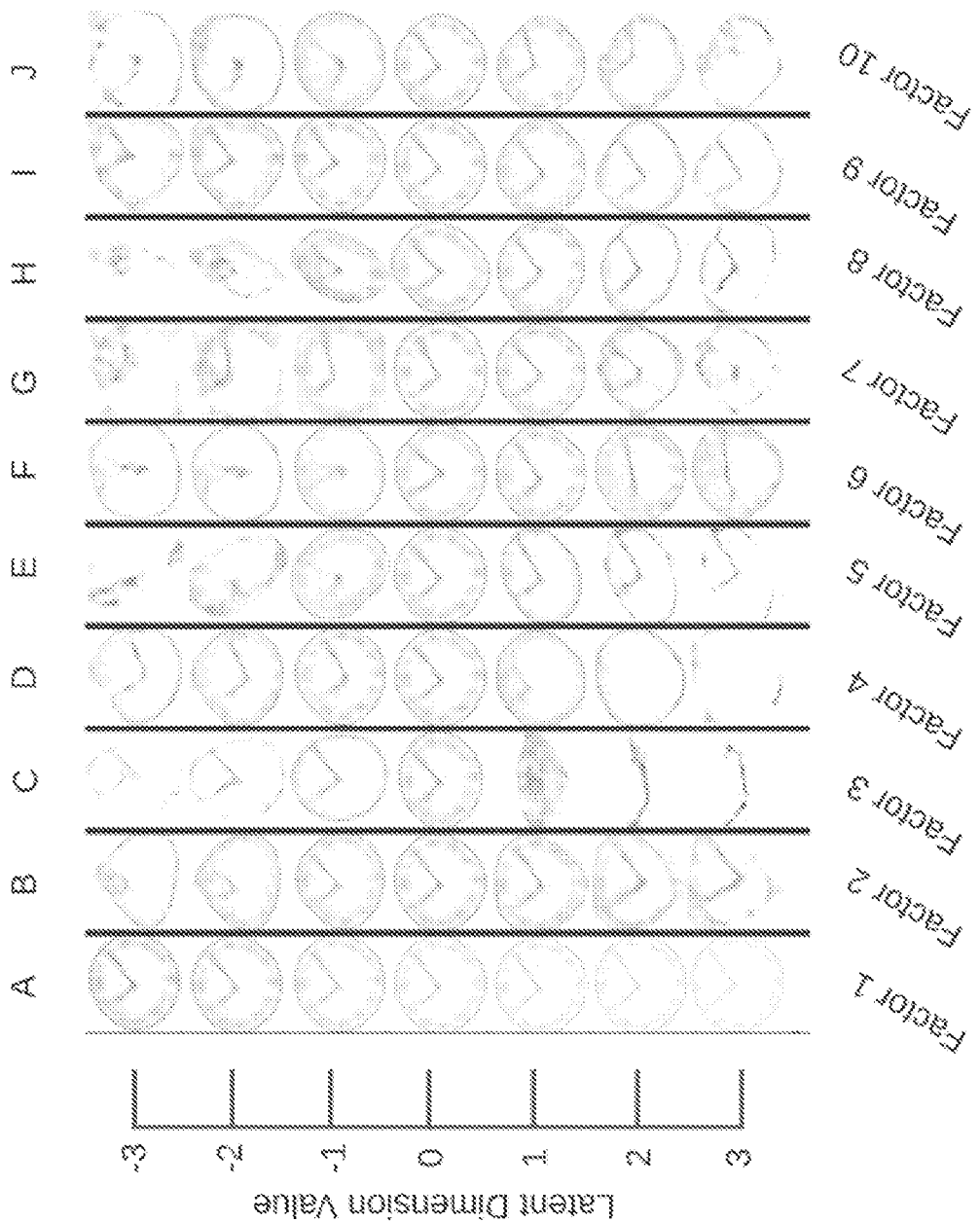
FIG. 15A and FIG. 15B illustrate example descriptions of a relevance factor variational autoencoder machine learning model trained latent space in accordance with some embodiments discussed herein.

FIG. 15A presents an example description of an RF-VAE machine learning model trained latent space after completion of unsupervised training with clock drawings of a training dataset according to some embodiments of the present disclosure. Each column represents a latent dimension and a traversal over the latent space along that dimension ranging from −3 (top) to +3 (bottom). Due to disentanglement, no cross-correlation exists between the latent dimensions. As depicted in FIG. 15A, ten disentangled constructive imperfections are identified by the RF-VAE machine learning model from the training dataset. The ten disentangled constructive imperfections may be identified as latent variables for which reconstructed clock drawings may be generated by a decoder of the RF-VAE machine learning model.

Figure 15B:
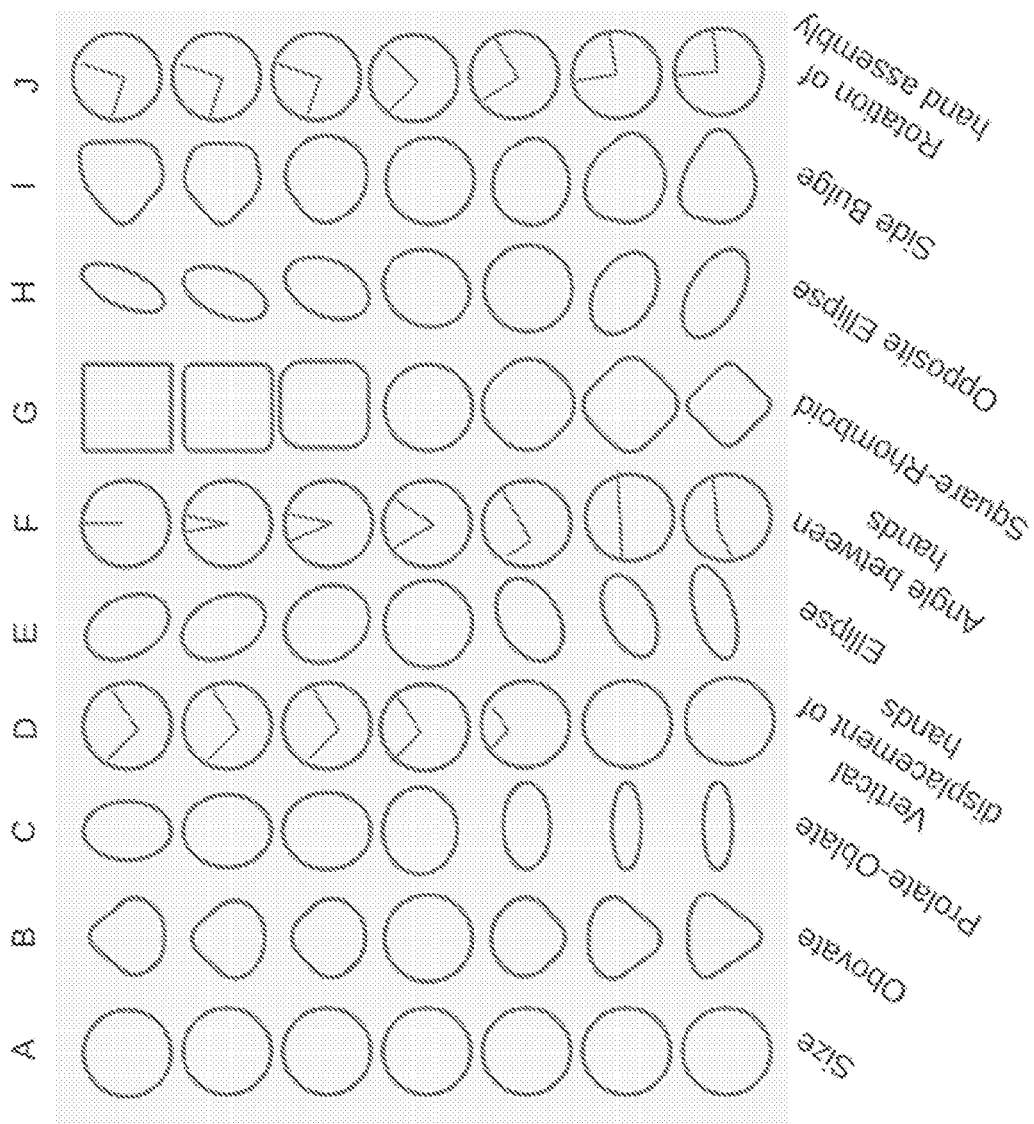

FIG. 15B presents a representative nature of each latent space traversal and elucidates its change over the corresponding latent dimension. Each latent dimension may be described by a constructional aspect of the clock drawing which most closely resembles the traversal of reconstructed clocks over the particular latent dimension. As depicted in FIG. 15B, column A corresponds to the size of the clock drawing. Column B corresponds to an existence of obovate (avocado-shaped) clocks in the training dataset. The direction of orientation of the obovate clock reverses as this latent dimension increases. This increase is associated with a lengthening of the clock hands. Column C encodes the change of clock shape from prolate (elongated) to oblate (flattened) with an increase in its latent dimension. Column D corresponds to an upward movement of the point of intersection of the clock hands from the geometric clock center, with an increase in its latent dimension. Column E corresponds to the presence of eccentric ellipsoidal clock drawings. The direction of the eccentricity of ellipsoidal clocks may change from left-facing to right-facing as this latent dimension increases. Column F corresponds to an increase in the angle between the clock hands as its latent dimension increases. Column G corresponds to an existence of non-circular clocks in the dataset. An increase in this latent dimension transitioned the clock shape from square-circular-rhomboid. Column H corresponds to ellipsoidal clocks, but in this case, the orientation changes from right to left as the latent dimension increases (i.e., opposite of Column E). Column I corresponds to a presence of clocks that have a horizontal circular asymmetry (side bulge). The side bulge changes position from left to right as the latent dimension increases. Column J corresponds to a rotation of the clock hands while maintaining a constant inter-hand angle.

Figure 16:
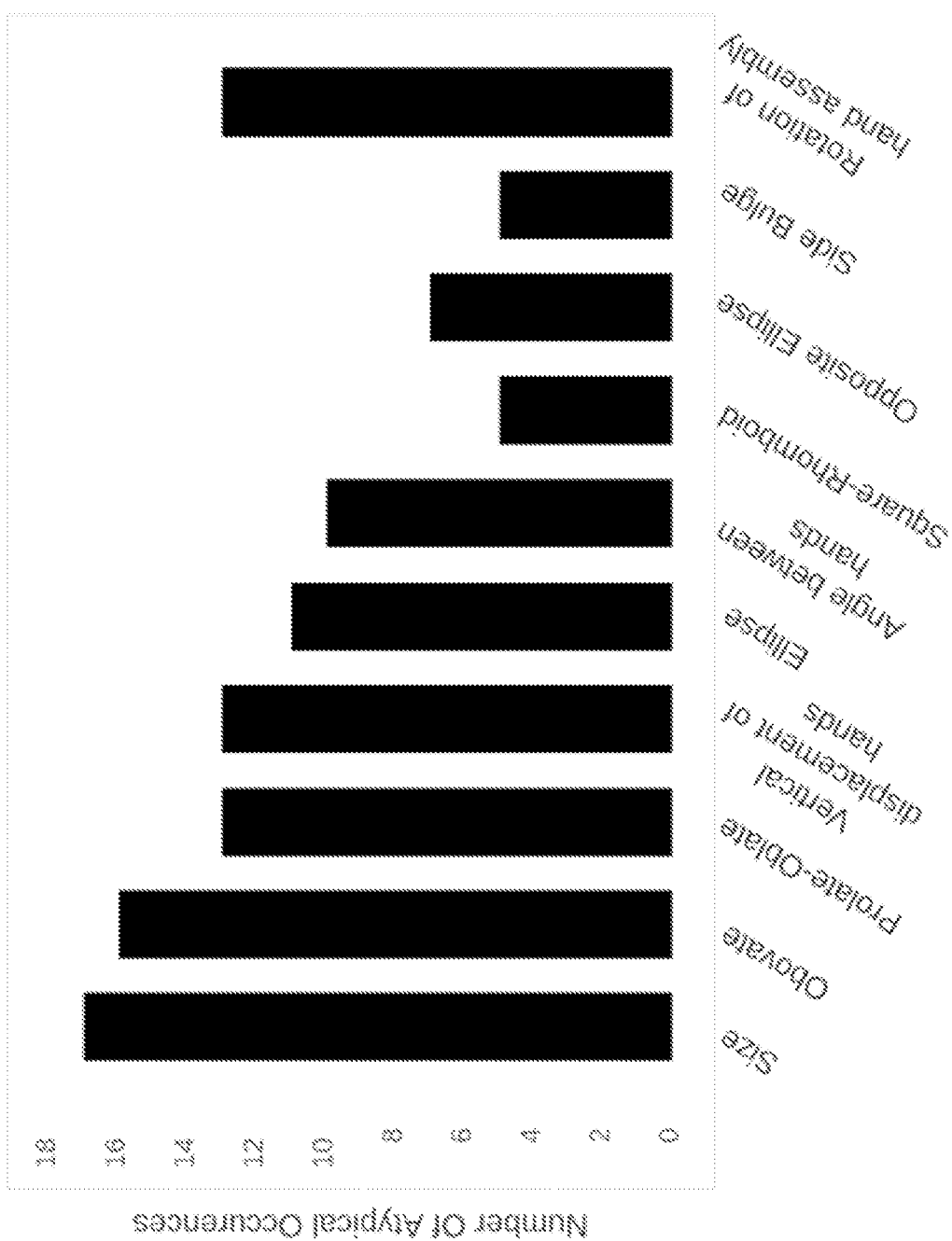
FIG. 16 illustrates example distribution of atypical occurrences of each variable in dementia samples in accordance with some embodiments discussed herein.

The number of atypical occurrences of each latent variable in the dementia samples, as depicted in FIG. 16, may be determined by comparing them against the mean and standard deviation of the respective non-dementia distribution. Clocks in a classification dataset may contain anomalies corresponding to the latent variables to different degrees. Size may have the highest number of atypical occurrences in the dementia cohort. Square-rhomboid and side-bulge may have the least number of atypical occurrences in the dementia cohort. Size, obovateness, prolate/oblateness, vertical displacement of clock hand assembly, and rotation of clock hand assembly may be most frequently atypical in dementia clocks.

Figure 17A:
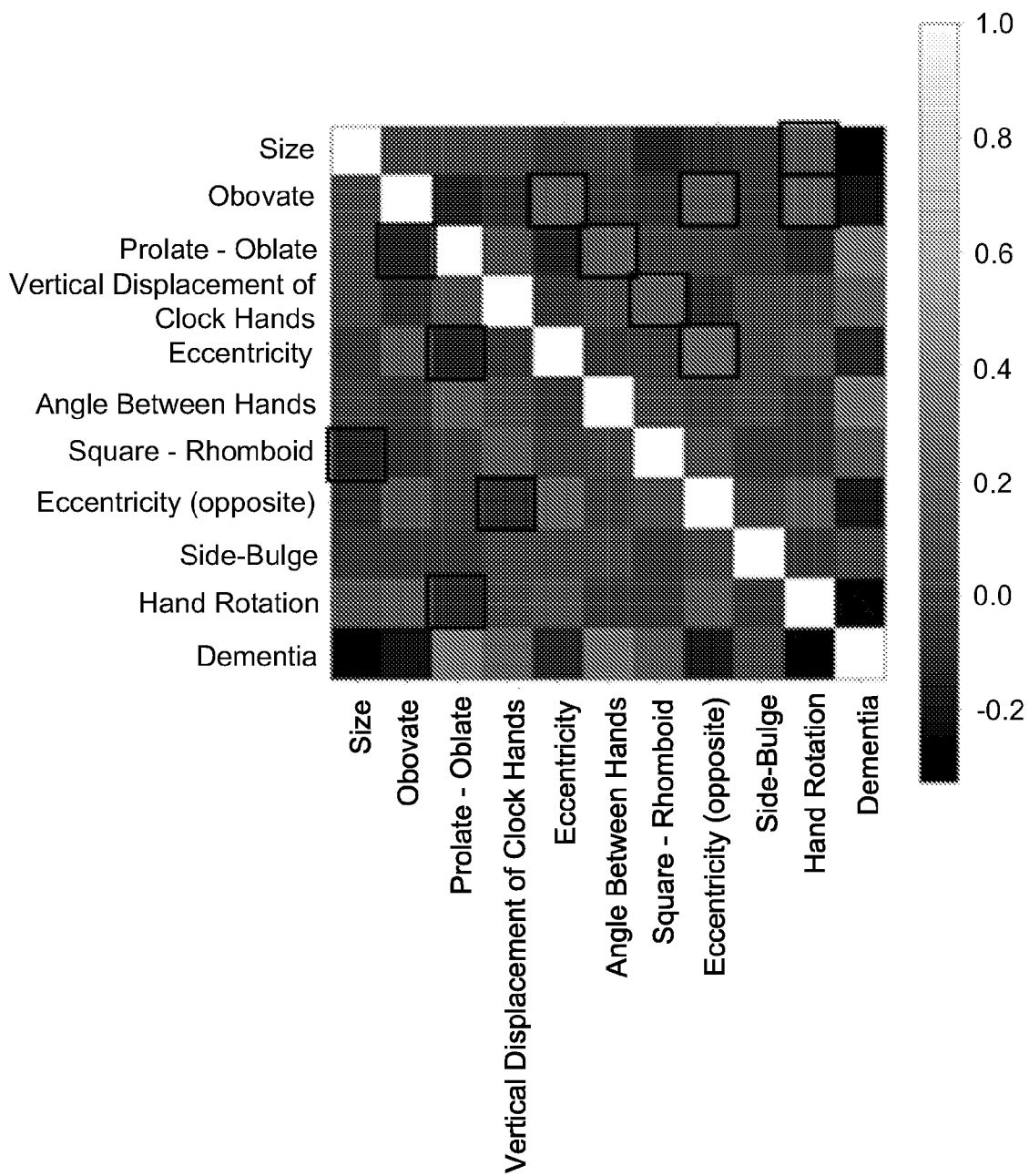
FIG. 17A illustrates an example cross-correlation matrix between latent features found by a relevance factor variational autoencoder machine learning model in accordance with some embodiments discussed herein.
Figure 17B:
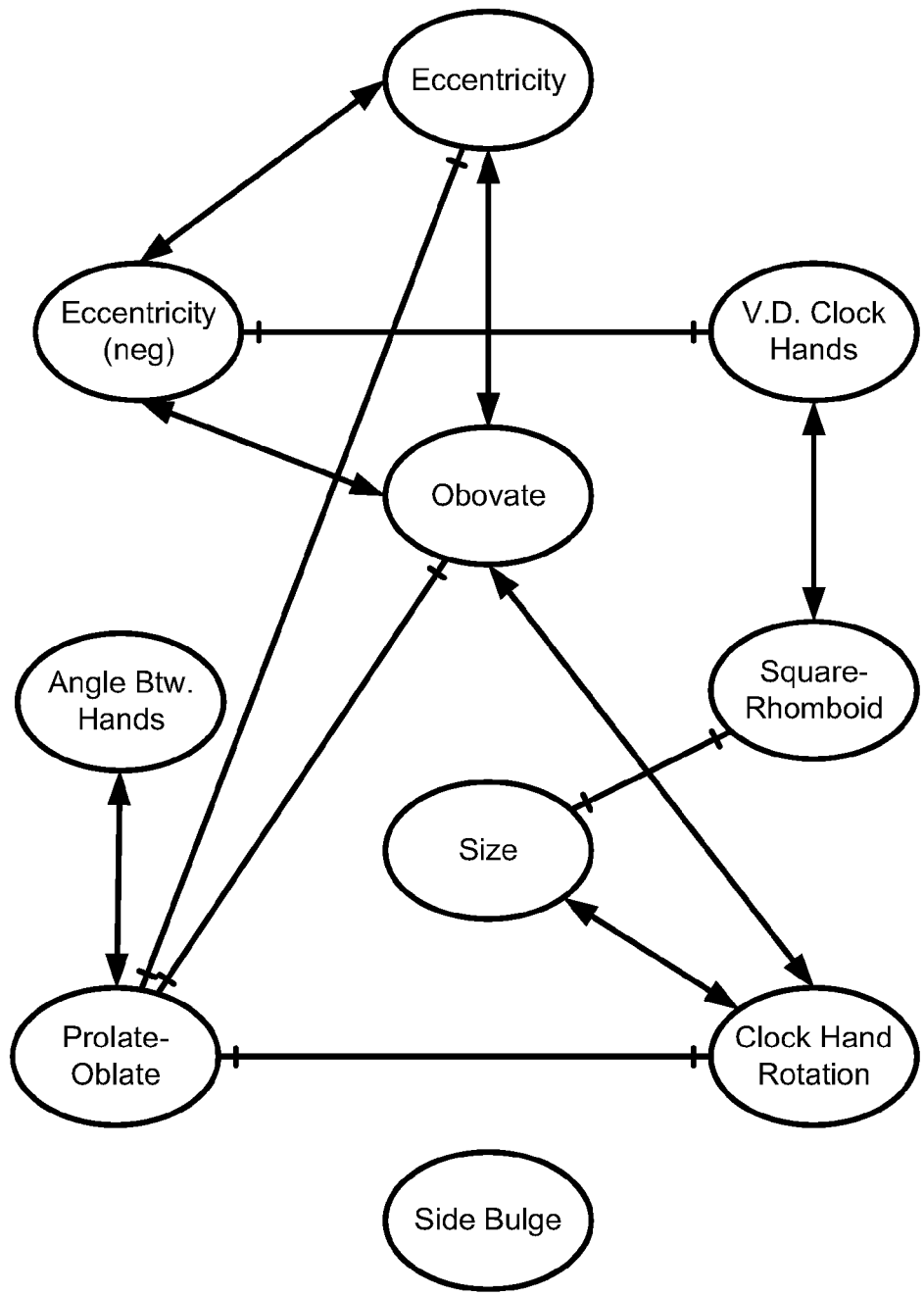
FIG. 17B illustrates an example adjacency graph representing relationships between latent variables in accordance with some embodiments discussed herein.

FIG. 17A presents a cross-correlation matrix between example latent features found by an RF-VAE machine learning model. Correlation between each latent dimension and dementia label is depicted in FIG. 17A. Based on the cross-correlation between different latent variables on the classification dataset, the presence of significant positive and negative correlations may be determined. The positive and negative correlations may be used as adjacency values of a graph to represent the relations between the latent variables in a graphical format, as depicted in FIG. 17B. For example, a feature co-occurrence network may be constructed using significant correlation values as the adjacency matrix.

FIG. 17B further depicts the presence of three subnetworks characterized by strong intra-network positive correlation (correlation>0.2) and inter-network negative correlations (correlation<−0.2). Three subnetworks emerge where intra-subnetwork features are positively correlated with one another, and inter-subnetwork features are negatively correlated with each other. The three subnetworks comprise a. Obovate—Eccentricity, b. Vertical displacement of clock hands—Square/Rhomboid, and c. Prolate/Oblate—Angle between clock hands. Prolate/Oblate is negatively correlated with eccentricity and obovate. Vertical displacement of clock hands is negatively correlated with eccentricity. Furthermore, clock size and rotation angle of clock hand assembly show a weak positive correlation (correlation ~0.1). Clock size is negatively correlated with square/rhomboid. Clock hand rotation is negatively correlated with prolate/oblate. Side-bulge is not significantly correlated to any other feature.

Figure 18A:
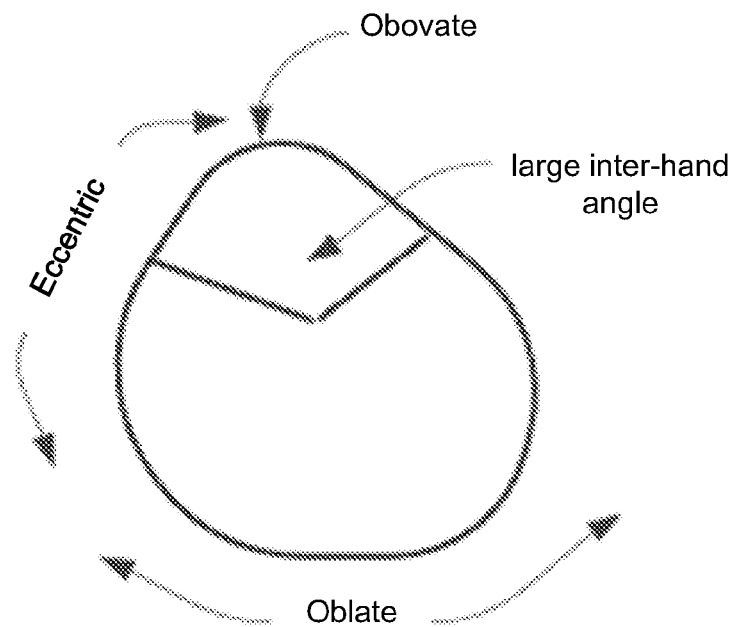
FIG. 18A illustrates a hypothetical clock drawing comprising a combination of key latent variables most highly associated with dementia in accordance with some embodiments discussed herein.

FIG. 18A depicts a hypothetical clock drawing comprising a combination of key latent variables most highly associated with dementia. Clock drawings that are small, avocado shaped (obovate dimension<0), oblate (prolate/oblate dimension>0), eccentric (eccentricity dimension<0), and have a large angle between clock hands may be determined as indicative of dementia.

Figure 18B:
FIG. 18B illustrates an example clock drawing determined as having the highest probability of being dementia in accordance with some embodiments discussed herein.

FIG. 18B depicts an example clock drawing determined as having a highest probability of being associated with dementia by the disclosed RF-VAE machine learning model. The disclosed RF-VAE machine learning model latent variables are generally different from traditional analog metrics used to score a clock drawing test, such as digit placement accuracy, missing digits, hand placement accuracy and the ratio of hour hand to minute hand length. The RF-VAE machine learning model latent variables are representative of a global change in the shape of the clockface and placement of clock hands. Despite broad differences, some similarities exist.

Figure 18C:
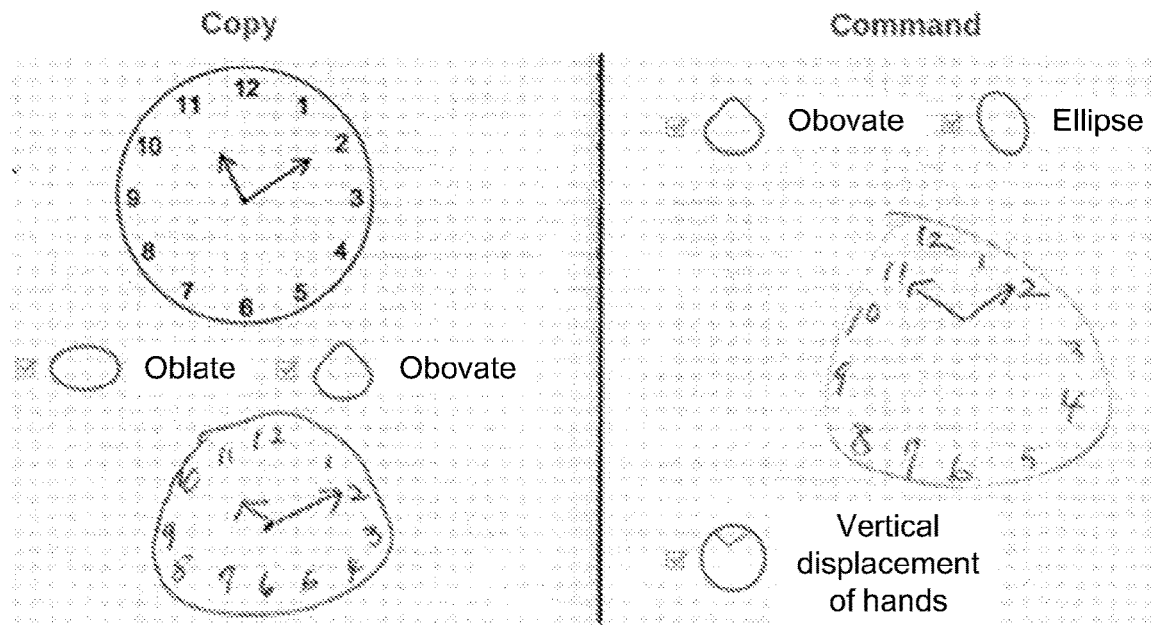
FIG. 18C and FIG. 18D illustrate example command and copy clocks drawn by individuals with corresponding error annotations generated by a relevance factor variational autoencoder in accordance with some embodiments discussed herein.
Figure 18D:
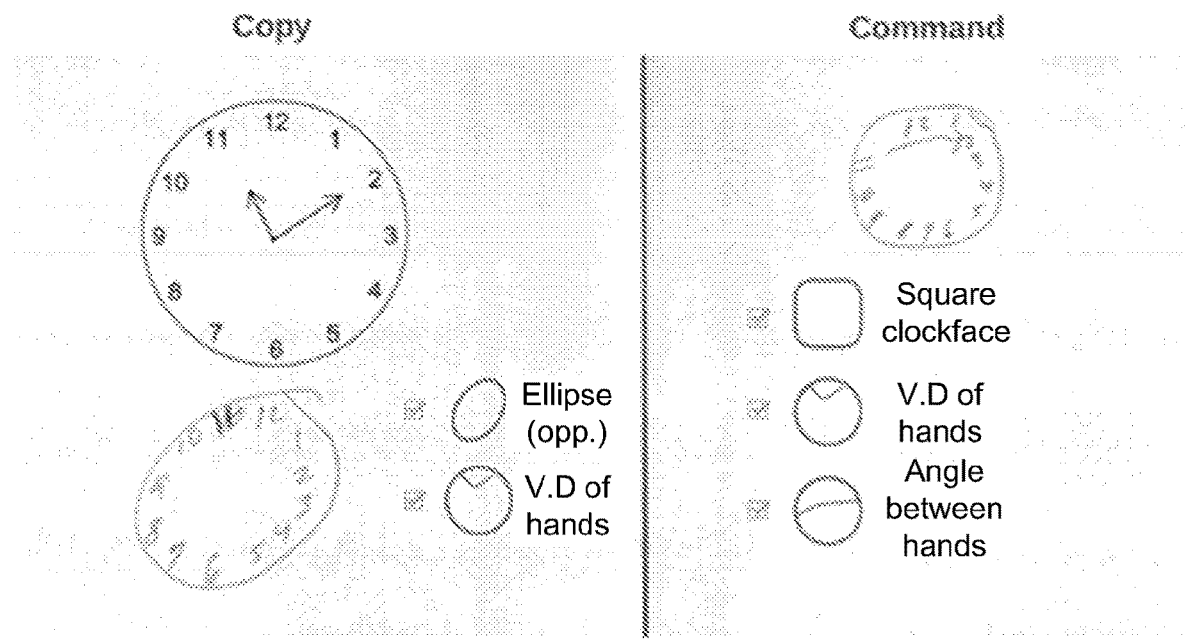

FIG. 18C presents example command and copy clocks drawn by a first individual with errors discovered based on the latent variables of RF-VAE machine learning model (e.g., for comparison with FIG. 1A). FIG. 18D presents example command and copy clocks drawn by a second individual with errors discovered based on the latent variables of RF-VAE machine learning model (e.g., for comparison with FIG. 1B). FIGS. 18C and 18D depict factors that are atypically expressed in the CDTs shown in FIG. 1A and FIG. 1B. By comparing FIG. 1A and FIG. 1B with FIG. 18C and FIG. 18D, one of ordinary skill in the art can recognize that the disclosed RF-VAE machine learning model factors represent the graphomotor elements of a clock drawing in a novel and more nuanced way than traditional scoring criteria.

Despite disentanglement being prima facie in discovering unique constructional features of clock drawings, some features may be algorithmically associated. For example, increased oblateness will increase angle between clock hands, and a change in the shape of the clock face from circular to square can cause a vertical displacement of the hand assembly. These factors may be reflected in the sub-networks found in the classification dataset's cross-correlation patterns between variables. The statistical disentanglement achieved by the disclosed RF-VAE machine learning model may not necessarily translate to algorithmic independence between the features. Weak positive correlation between size and clockwise rotation of the clock hand assembly may define the ideal clockface. Some of these factors may be important in classifying different subtypes of dementia and other cognitive frailties. For instance, a smaller clockface area may be associated with subcortical disease profiles with primary executive dysfunction (e.g., micrographia in Parkinson's disease), and misplacement of clock hands may be associated with visual attention deficits and disinhibition.

According to various embodiments of the present disclosure, factorized VAE machine learning models can compress clock drawings of CDTs into a set of highly informative, statistically disentangled latent dimensions. These latent dimensions may serve as generative features of the CDT and possess key information on characterizing dementia. The RF-VAE machine learning model can be trained in an unsupervised manner and agnostic to cognitive outcomes so that it can identify general, robust features that are informative to any downstream classification task. Thus, the same latent space can be fine-tuned to any downstream classification task related to clock drawings. Due to this advantage inherent in semi-supervised learning, different cognitive stressors (e.g., surgery, trauma) may also be represented with a unique combination of the latent variables described herein. As such, the prognosis of cognitive ailments may be predicted through a CDT. Furthermore, the disclosed RF-VAE machine learning model latent space may also be used to distinguish different types of dementia such as AD, VaD, mild cognitive impairment (MCI), amnestic-MCI, dysexecutive-MCI, and Parkinson's disease. Given that the presently disclosed RF-VAE machine learning model is associated with CDT outcomes, it can leverage large amounts of publicly available CDT data for enriching the performance of its disease-specific classifiers.

CONCLUSION

Having thus described several aspects and embodiments of the technology set forth in the disclosure, it is to be appreciated that various alterations, modifications, and improvements will readily occur to those skilled in the art. Such alterations, modifications, and improvements are intended to be within the spirit and scope of the technology described herein. For example, those of ordinary skill in the art will readily envision a variety of other means and/or structures for performing the function and/or obtaining the results and/or one or more of the advantages described herein, and each of such variations and/or modifications is deemed to be within the scope of the embodiments described herein. Those skilled in the art will recognize or be able to ascertain using no more than routine experimentation, many equivalents to the specific embodiments described herein. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, kits, and/or methods described herein, if such features, systems, articles, materials, kits, and/or methods are not mutually inconsistent, is included within the scope of the present disclosure.

EXAMPLES

Example 1. A computer-implemented method for performing image classification, the method comprising: receiving, by one or more computing devices, a classification dataset comprising first one or more clock drawing images; generating, by the one or more computing devices using a classifier, one or more classification outputs, the one or more classification outputs comprising one or more identifications of dementia or non-dementia for respective ones of the one or more clock drawing images, wherein: (i) the classifier comprises one or more weights based on a latent space associated with a relevance factor variational autoencoder (RF-VAE) machine learning model, (ii) the RF-VAE machine learning model is trained based on a training dataset comprising second one or more clock drawings, (iii) the RF-VAE machine learning model comprises an encoder configured to generate the latent space, (iv) the RF-VAE machine learning model comprises a decoder configured to generate reconstructions of the second one or more clock drawings based on the latent space, (v) the latent space comprises one or more latent dimensions representative of one or more unique aspects of variation associated with the second one or more clock drawings, and (vi) the one or more latent dimensions comprise minimal total correlation between the one or more latent dimensions; and initiating, by the one or more computing devices, performance of one or more prediction-based actions based on the one or more classification outputs.

Example 2. The computer-implemented method of any of the preceding examples, wherein the RF-VAE machine learning model is trained based on unsupervised learning with the second one or more clock drawings comprising unlabeled clock drawings.

Example 3. The computer-implemented method of any of the preceding examples, wherein one or more latent variables associated with the one or more latent dimensions are provided to the classifier as standalone features for distinguishing dementia from non-dementia.

Example 4. The computer-implemented method of any of the preceding examples, wherein demographic information is provided to the classifier as additional distinguishing features.

Example 5. The computer-implemented method of any of the preceding examples, wherein the classifier comprises a fully connected feed-forward neural network that is fine-tuned jointly with the encoder.

Example 6. The computer-implemented method of any of the preceding examples, wherein one or more weights of the encoder is fine-tuned under supervised fine-tuning based on a fine-tuning dataset.

Example 7. The computer-implemented method of any of the preceding examples, wherein the fine-tuning dataset comprises third one or more clock drawings and labels associated with the third one or more clock drawings.

Example 8. The computer-implemented method of any of the preceding examples, wherein the latent space comprises dementia and control regions.

Example 9. The computer-implemented method of any of the preceding examples further comprising identifying the dementia and control regions by using a k-nearest neighbor classifier.

Example 10. The computer-implemented method of any of the preceding examples, wherein the one or more latent dimensions comprises at least one of i) size, ii) degree and orientation of obovate, iii) prolate—oblate, iv) vertical displacement of a point of intersection of clock hands, v) a first degree and direction of eccentricity of an ellipsoid, vi) angle between clock hands, vii) square—rhomboid clockfaces, viii) a second degree and direction of eccentricity of an ellipsoid opposite of the first degree and direction, ix) a degree and direction of side-bulge of clockface, or x) rotation of clock hands assembly.

Example 11. The computer-implemented method of any of the preceding examples, wherein the one or more latent dimensions comprises two dimensions.

Example 12. A computing apparatus comprising memory and one or more processors communicatively coupled to the memory, the one or more processors configured to: receive a classification dataset comprising first one or more clock drawing images; generate, using a classifier, one or more classification outputs, the one or more classification outputs comprising one or more identifications of dementia or non-dementia for respective ones of the one or more clock drawing images, wherein: (i) the classifier comprises one or more weights based on a latent space associated with a relevance factor variational autoencoder (RF-VAE) machine learning model, (ii) the RF-VAE machine learning model is trained based on a training dataset comprising second one or more clock drawings, (iii) the RF-VAE machine learning model comprises an encoder configured to generate the latent space, (iv) the RF-VAE machine learning model comprises a decoder configured to generate reconstructions of the second one or more clock drawings based on the latent space, (v) the latent space comprises one or more latent dimensions representative of one or more unique aspects of variation associated with the second one or more clock drawings, and (vi) the one or more latent dimensions comprise minimal total correlation between the one or more latent dimensions; and initiate performance of one or more prediction-based actions based on the one or more classification outputs.

Example 13. The computing apparatus of any of the preceding examples, wherein the RF-VAE machine learning model is trained based on unsupervised learning with the second one or more clock drawings comprising unlabeled clock drawings.

Example 14. The computing apparatus of any of the preceding examples, wherein one or more latent variables associated with the one or more latent dimensions are provided to the classifier as standalone features for distinguishing dementia from non-dementia.

Example 15. The computing apparatus of any of the preceding examples, wherein demographic information is provided to the classifier as additional distinguishing features.

Example 16. The computing apparatus of any of the preceding examples, wherein the classifier comprises a fully connected feed-forward neural network that is fine-tuned jointly with the encoder.

Example 17. The computing apparatus of any of the preceding examples, wherein one or more weights of the encoder is fine-tuned under supervised fine-tuning based on a fine-tuning dataset.

Example 18. The computing apparatus of any of the preceding examples, wherein the fine-tuning dataset comprises third one or more clock drawings and labels associated with the third one or more clock drawings.

Example 19. The computing apparatus of any of the preceding examples, wherein the latent space comprises dementia and control regions.

Example 20. The computing apparatus of any of the preceding examples, wherein the one or more processors are further configured to identify the dementia and control regions by using a k-nearest neighbor classifier.

Example 21. The computing apparatus of any of the preceding examples, wherein the one or more latent dimensions comprises at least one of i) size, ii) degree and orientation of obovate, iii) prolate—oblate, iv) vertical displacement of a point of intersection of clock hands, v) a first degree and direction of eccentricity of an ellipsoid, vi) angle between clock hands, vii) square—rhomboid clockfaces, viii) a second degree and direction of eccentricity of an ellipsoid opposite of the first degree and direction, ix) a degree and direction of side-bulge of clockface, or x) rotation of clock hands assembly.

Example 22. The computing apparatus of any of the preceding examples, wherein the one or more latent dimensions comprises two dimensions.

Example 23. One or more non-transitory computer-readable storage media including instructions that, when executed by one or more processors, cause the one or more processors to: receive a classification dataset comprising first one or more clock drawing images; generate, using a classifier, one or more classification outputs, the one or more classification outputs comprising one or more identifications of dementia or non-dementia for respective ones of the one or more clock drawing images, wherein: (i) the classifier comprises one or more weights based on a latent space associated with a relevance factor variational autoencoder (RF-VAE) machine learning model, (ii) the RF-VAE machine learning model is trained based on a training dataset comprising second one or more clock drawings, (iii) the RF-VAE machine learning model comprises an encoder configured to generate the latent space, (iv) the RF-VAE machine learning model comprises a decoder configured to generate reconstructions of the second one or more clock drawings based on the latent space, (v) the latent space comprises one or more latent dimensions representative of one or more unique aspects of variation associated with the second one or more clock drawings, and (vi) the one or more latent dimensions comprise minimal total correlation between the one or more latent dimensions; and initiate performance of one or more prediction-based actions based on the one or more classification outputs.

Example 24. The one or more non-transitory computer-readable storage media of any of the preceding examples, wherein the RF-VAE machine learning model is trained based on unsupervised learning with the second one or more clock drawings comprising unlabeled clock drawings.

Example 25. The one or more non-transitory computer-readable storage media of any of the preceding examples, wherein one or more latent variables associated with the one or more latent dimensions are provided to the classifier as standalone features for distinguishing dementia from non-dementia.

Example 26. The one or more non-transitory computer-readable storage media of any of the preceding examples, wherein demographic information is provided to the classifier as additional distinguishing features.

Example 27. The one or more non-transitory computer-readable storage media of any of the preceding examples, wherein the classifier comprises a fully connected feed-forward neural network that is fine-tuned jointly with the encoder.

Example 28. The one or more non-transitory computer-readable storage media of any of the preceding examples, wherein one or more weights of the encoder is fine-tuned under supervised fine-tuning based on a fine-tuning dataset.

Example 29. The one or more non-transitory computer-readable storage media of any of the preceding examples, wherein the fine-tuning dataset comprises third one or more clock drawings and labels associated with the third one or more clock drawings.

Example 30. The one or more non-transitory computer-readable storage media of any of the preceding examples, wherein the latent space comprises dementia and control regions.

Example 31. The one or more non-transitory computer-readable storage media of any of the preceding examples further comprising identifying the dementia and control regions by using a k-nearest neighbor classifier.

Example 32. The one or more non-transitory computer-readable storage media of any of the preceding examples, wherein the one or more latent dimensions comprises at least one of i) size, ii) degree and orientation of obovate, iii) prolate—oblate, iv) vertical displacement of a point of intersection of clock hands, v) a first degree and direction of eccentricity of an ellipsoid, vi) angle between clock hands, vii) square—rhomboid clockfaces, viii) a second degree and direction of eccentricity of an ellipsoid opposite of the first degree and direction, ix) a degree and direction of side-bulge of clockface, or x) rotation of clock hands assembly.

Example 33. The one or more non-transitory computer-readable storage media of any of the preceding examples, wherein the one or more latent dimensions comprises two dimensions.

The invention claimed is:

1. A computer-implemented method for performing image classification, the method comprising:
   receiving, by one or more computing devices, a classification dataset comprising one or more first clock drawing images;
   generating, by the one or more computing devices using a classifier, one or more classification outputs, the one or more classification outputs comprising one or more identifications of dementia or non-dementia corresponding to the one or more first clock drawing images, wherein:
   (i) the classifier comprises a neural network that is generated one or more weights based on a latent space provided from a relevance factor variational autoencoder (RF-VAE) machine learning model, (ii) the RF-VAE machine learning model is trained based on a training dataset comprising one or more second clock drawings, (iii) the latent space comprises a plurality of latent dimensions that respectively corresponds to (a) a plurality of clock drawing features associated with the one or more second clock drawings and (b) one or more contextual features corresponding to contextual information that are associated with distinguishing dementia from non-dementia, (iv) the RF-VAE machine learning model comprises an encoder configured to generate the latent space by (a) encoding the one or more second clock drawings into the latent space and (b) minimizing total correlation loss between the plurality of latent dimensions, (v) the RF-VAE machine learning model comprises a decoder configured to generate one or more reconstructed images based on the latent space, and (vi) the encoder comprises one or more weights that are modified by minimizing a reconstruction loss based on a comparison of the one or more reconstructed images with the one or more second clock drawings; and initiating, by the one or more computing devices, performance of one or more prediction-based actions based on the one or more classification outputs.

2. The computer-implemented method of claim 1, wherein the RF-VAE machine learning model is trained based on unsupervised learning with the one or more second clock drawings comprising unlabeled clock drawings.

3. The computer-implemented method of claim 1, wherein one or more latent variables associated with the plurality of latent dimensions are provided to the classifier as standalone features for distinguishing dementia from non-dementia.

4. The computer-implemented method of claim 1, wherein the one or more contextual features comprises demographic information corresponding to age, sex, race, or years of education.

5. The computer-implemented method of claim 1, wherein the classifier comprises a fully connected feed-forward neural network that is fine-tuned jointly with the encoder.

6. The computer-implemented method of claim 1, wherein one or more weights of the encoder is fine-tuned under supervised fine-tuning based on a fine-tuning dataset.

7. The computer-implemented method of claim 6, wherein the fine-tuning dataset comprises third one or more clock drawings and labels associated with the third one or more clock drawings.

8. The computer-implemented method of claim 1, wherein the latent space comprises dementia and control regions.

9. The computer-implemented method of claim 8 further comprising identifying the dementia and control regions by using a k-nearest neighbor classifier.

10. The computer-implemented method of claim 1, wherein the plurality of latent dimensions corresponds to at least one of i) size, ii) degree and orientation of obovate, iii) prolate-oblate, iv) vertical displacement of a point of intersection of clock hands, v) a first degree and direction of eccentricity of an ellipsoid, vi) angle between clock hands, vii) square-rhomboid clockfaces, viii) a second degree and direction of eccentricity of an ellipsoid opposite of the first degree and direction, ix) a degree and direction of side-bulge of clockface, or x) rotation of clock hands assembly.

11. The computer-implemented method of claim 1, wherein the plurality of latent dimensions comprises two dimensions.

12. A computing apparatus comprising memory and one or more processors communicatively coupled to the memory, the one or more processors configured to:

receive a classification dataset comprising one or more first clock drawing images;

generate, using a classifier, one or more classification outputs, the one or more classification outputs comprising one or more identifications of dementia or non-dementia corresponding to the one or more first clock drawing images, wherein:

(i) the classifier comprises a neural network that is generated based on a latent space provided from a relevance factor variational autoencoder (RF-VAE) machine learning model, (ii) the RF-VAE machine learning model is trained based on a training dataset comprising one or more second clock drawings, (iii) the latent space comprises a plurality of latent dimensions that respectively corresponds to (a) a plurality of clock drawing features associated with the one or more second clock drawings and (b) one or more contextual features corresponding to contextual information that are associated with distinguishing dementia from non-dementia, (iv) the RF-VAE machine learning model comprises an encoder configured to generate the latent space by (a) encoding the one or more second clock drawings into the latent space and (b) minimizing total correlation loss between the plurality of latent dimensions, (v) the RF-VAE machine learning model comprises a decoder configured to generate one or more reconstructed images based on the latent space, and (vi) the encoder comprises one or more weights that are modified by minimizing a reconstruction loss based on a comparison of the one or more reconstructed images with the one or more second clock drawings; and initiate performance of one or more prediction-based actions based on the one or more classification outputs.

13. The computing apparatus of claim 12, wherein the RF-VAE machine learning model is trained based on unsupervised learning with the one or more second clock drawings comprising unlabeled clock drawings.

14. The computing apparatus of claim 12, wherein one or more latent variables associated with the plurality of latent dimensions are provided to the classifier as standalone features for distinguishing dementia from non-dementia.

15. The computing apparatus of claim 12, wherein the one or more contextual features comprises demographic information corresponding to age, sex, race, or years of education.

16. The computing apparatus of claim 12, wherein the classifier comprises a fully connected feed-forward neural network that is fine-tuned jointly with the encoder.

17. The computing apparatus of claim 12, wherein one or more weights of the encoder is fine-tuned under supervised fine-tuning based on a fine-tuning dataset, and the fine-tuning dataset comprises third one or more clock drawings and labels associated with the third one or more clock drawings.

18. The computing apparatus of claim 12, wherein the latent space comprises dementia and control regions.

19. The computing apparatus of claim 12, wherein the plurality of latent dimensions corresponds to at least one of i) size, ii) degree and orientation of obovate, iii) prolate-oblate, iv) vertical displacement of a point of intersection of clock hands, v) a first degree and direction of eccentricity of an ellipsoid, vi) angle between clock hands, vii) square-rhomboid clockfaces, viii) a second degree and direction of eccentricity of an ellipsoid opposite of the first degree and direction, ix) a degree and direction of side-bulge of clockface, or x) rotation of clock hands assembly.

20. One or more non-transitory computer-readable storage media including instructions that, when executed by one or more processors, cause the one or more processors to:

receive a classification dataset comprising one or more first clock drawing images;

generate, using a classifier, one or more classification outputs, the one or more classification outputs comprising one or more identifications of dementia or non-dementia corresponding to the one or more first clock drawing images, wherein:

(i) the classifier comprises a neural network that is generated based on a latent space provided from a relevance factor variational autoencoder (RF-VAE) machine learning model, (ii) the RF-VAE machine learning model is trained based on a training dataset comprising one or more second clock drawings, (iii) the latent space comprises a plurality of latent dimensions that respectively corresponds to (a) a plurality of clock drawing features associated with the one or more second clock drawings and (b) one or more contextual features corresponding to contextual information that are associated with distinguishing dementia from non-dementia, (iv) the RF-VAE machine learning model comprises an encoder configured to generate the latent space by (a) encoding the one or more second clock drawings into the latent space and (b) minimizing total correlation loss between the plurality of latent dimensions, (v) the RF-VAE machine learning model comprises a decoder configured to generate one or more reconstructed images based on the latent space, and (vi) the encoder comprises one or more weights that are modified by minimizing a reconstruction loss based on a comparison of the one or more reconstructed images with the one or more second clock drawings; and initiate performance of one or more prediction-based actions based on the one or more classification outputs.

* * * * *